US012780458B2

(12) United States Patent
Jiang et al.

(10) Patent No.: US 12,780,458 B2
(45) Date of Patent: Nov. 3, 2026

(54) UAV CONTROL METHOD, IMAGE DISPLAY METHOD, UAV, AND CONTROL TERMINAL

(71) Applicant: SZ DJI TECHNOLOGY CO., LTD., Shenzhen (CN)

(72) Inventors: Bing Jiang, Shenzhen (CN); Luoxiao Qin, Shenzhen (CN); Wenhui Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/917,744

(22) Filed: Oct. 16, 2024

(65) Prior Publication Data

US 2025/0033809 A1 Jan. 30, 2025

Related U.S. Application Data

(63) Continuation of application No. PCT/CN2022/087937, filed on Apr. 20, 2022.

(51) Int. Cl.
*B64U 20/87* (2023.01)

(52) U.S. Cl.
CPC .......... *B64U 20/87* (2023.01); *B64U 2201/20* (2023.01)

(58) Field of Classification Search
CPC ................ B64U 20/87; B64U 2201/20; B64U 2101/30; G05D 1/2232; G05D 1/2247; G05D 1/689; G05D 2105/345; G05D 2109/254
See application file for complete search history.

(56) References Cited

U.S. PATENT DOCUMENTS

| | | | | |
|---|---|---|---|---|
| 11,565,807 | B1 * | 1/2023 | Zuckerman | G05D 1/101 |
| 2016/0360087 | A1 | 12/2016 | Kwon et al. | |
| 2019/0215451 | A1 * | 7/2019 | Enke | G03B 17/56 |
| 2019/0238744 | A1 * | 8/2019 | Takami | H04N 5/2621 |
| 2020/0104598 | A1 * | 4/2020 | Qian | G06V 20/20 |
| 2020/0389593 | A1 * | 12/2020 | Hu | G03B 17/566 |
| 2021/0103293 | A1 | 4/2021 | Li et al. | |

FOREIGN PATENT DOCUMENTS

| | | | |
|---|---|---|---|
| CN | 107589691 | A | 1/2018 |
| CN | 108476288 | A | 8/2018 |
| CN | 108958614 | A | 12/2018 |
| CN | 109660723 | A | 4/2019 |
| CN | 110771141 | A | 2/2020 |

(Continued)

OTHER PUBLICATIONS

The World Intellectual Property Organization (WIPO) International Search Report for PCT/CN2022/087937 Jan. 3, 2023 6 Pages (including translation).

*Primary Examiner* — Nasim N Nirjhar
(74) *Attorney, Agent, or Firm* — ANOVA LAW GROUP, PLLC

(57) ABSTRACT

A control method of an aerial vehicle. The aerial vehicle includes a gimbal carrying an image acquisition device. The method includes obtaining a preliminary-flight trajectory of the aerial vehicle and control information of the gimbal that are set by a user, automatically controlling the aerial vehicle to move according to the preliminary-flight trajectory, and automatically controlling the gimbal and the image acquisition device to photograph a target object according to the control information of the gimbal.

19 Claims, 25 Drawing Sheets

(56) References Cited

FOREIGN PATENT DOCUMENTS

| | | | |
|---|---|---|---|
| CN | 112154651 | A | 12/2020 |
| CN | 113424126 | A | 9/2021 |
| CN | 113841386 | A | 12/2021 |
| WO | 2021026776 | A1 | 2/2021 |
| WO | 2021134645 | A1 | 7/2021 |
| WO | 2021212445 | A1 | 10/2021 |
| WO | 2021212501 | A1 | 10/2021 |
| WO | 2022061536 | A1 | 3/2022 |

* cited by examiner

Display people (Horizontal screen) Display environment (Horizontal screen)

UAV CONTROL METHOD, IMAGE DISPLAY METHOD, UAV, AND CONTROL TERMINAL

CROSS-REFERENCE TO RELATED APPLICATION

This application is a continuation of International Patent Application No. PCT/CN2022/087937, filed on Apr. 20, 2022, the entire content of which is incorporated herein by reference.

TECHNICAL FIELD

The present disclosure generally relates to the field of aerial vehicle technology, and, more particularly, to a control method for an aerial vehicle (such as an unmanned aerial vehicle, UAV), an image display method, an aerial vehicle (such as a UAV), and a control terminal.

BACKGROUND

QuickShot is a function that can help users automatically and quickly obtain ornamental video clips. With the rapid development of aerial vehicle technology, the QuickShot function is becoming more and more popular with users. Previously, in the process of implementing the QuickShot function, the action of a gimbal set on an aerial vehicle is relatively simple. For example, in the process of photographing with an aerial vehicle, the gimbal direction is always static.

SUMMARY

In accordance with the disclosure, there is provided a control method of an aerial vehicle. The aerial vehicle includes a gimbal carrying an image acquisition device. The method includes obtaining a preliminary-flight trajectory of the aerial vehicle and control information of the gimbal that are set by a user, automatically controlling the aerial vehicle to move according to the preliminary-flight trajectory, and automatically controlling the gimbal and the image acquisition device to photograph a target object according to the control information of the gimbal.

Also in accordance with the disclosure, there is provided an aerial vehicle including a gimbal carrying an image acquisition device, at least one processor, and at least one memory including computer program code, where the at least one memory and the at least one processor are individually or collectively configured, with the computer program code, to cause the apparatus to at least obtain a preliminary-flight trajectory of the aerial vehicle and control information of the gimbal that are set by a user, automatically control the aerial vehicle to move according to the preliminary-flight trajectory, and automatically control the gimbal and the image acquisition device to photograph a target object according to the control information of the gimbal.

Also in accordance with the disclosure, there is provided an aerial vehicle system including an aerial vehicle including a gimbal and an image acquisition device carried by the gimbal, a control terminal including a screen configured to display a trajectory selection control and a gimbal control, at least one processor, and at least one memory including computer program code, where the at least one memory and the at least one processor are individually or collectively configured, with the computer program code, to cause the apparatus to at least generate a preliminary-flight trajectory of the aerial vehicle based on a user operation on the aerial vehicle trajectory selection control, automatically control the aerial vehicle to move according to the preliminary-flight trajectory, generate control information of the gimbal based on a user operation on the gimbal control, and automatically control the gimbal and the image acquisition device to photograph a target object according to the control information of the gimbal.

DETAILED DESCRIPTION OF THE EMBODIMENTS

Figure 1:
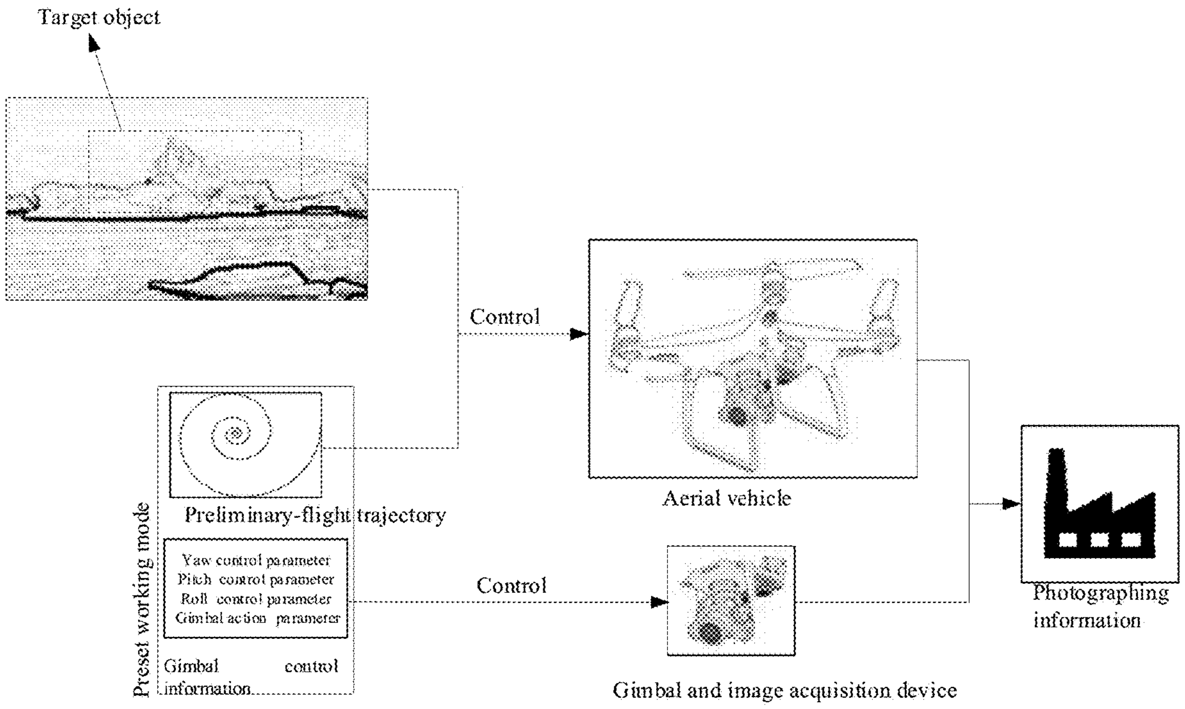
FIG. 1 is a schematic diagram showing a principle of a control method for an aerial vehicle consistent with the present disclosure.

Specific embodiments of the present disclosure are hereinafter described with reference to the accompanying drawings. The same or similar reference numbers represent the same or similar elements or elements with the same or similar functions. The described embodiments are merely examples of the present disclosure, but not all of embodiments provided by the present disclosure. The described embodiments should not be regarded as limiting, but are merely examples. Those skilled in the art will envision other modifications within the scope and spirit of the present disclosure.

Unless otherwise defined, all technical and scientific terms used herein have the same meaning as those commonly understood by those skilled in the art. The terms used in the specification of the present disclosure herein are only for the purpose of describing specific embodiments and are not intended to limit the present disclosure.

In the present disclosure, the terms "first" and "second" are only used for descriptive purposes and cannot be understood as indicating or implying the relative importance or implicitly indicating the quantity of the indicated technical features. Features defined as "first" and "second" may explicitly or implicitly include one or more of the described features. In the present disclosure, "plurality" means two or more, unless otherwise expressly and specifically limited.

In the present disclosure, unless otherwise clearly stated and limited, the terms "installation" or "connection" should be understood in a broad sense. For example, it may be a fixed connection, a detachable connection, or a connection in one piece. The connection may be mechanical or electrical. The connection may be a direct connection or an indirect connection through an intermediary. It can be an internal connection between two elements or an interaction between two elements. For those of ordinary skill in the art, the specific meanings of the above terms in the present disclosure can be understood according to specific circumstances.

The following disclosure provides many different embodiments or examples for implementing the various structures of the present disclosure. To simplify the description of the present disclosure, the components and arrangements of specific examples are described below. Of course, they are merely examples and are not intended to limit the scope of the present disclosure. Further, the reference numbers and/or reference letters may be repeated in different examples. Such repetition is for the purposes of simplicity and clarity and does not by itself indicate a relationship between the various embodiments and/or arrangements discussed. In addition, the present disclosure provides examples of various specific processes and materials, but those of ordinary skill in the art will recognize the application of other processes and/or the use of other materials.

To understand the specific implementation process of the technical solution in present disclosure, the following is a brief description of the relevant technology.

QuickShot is a function that assists users to automatically and quickly obtain ornamental video clips. With the rapid development of aerial vehicle technology, the QuickShot function is becoming more and more popular with users. Some aerial vehicles, such as unmanned aerial vehicles (UAVs), are able to realize automatic camera movement photographing of the QuickShot function, but previous QuickShot function and similar technologies have the following disadvantages.

(1) The gimbal action is limited, and the gimbal action is strongly bound to the flight trajectory of the aerial vehicle and cannot be freely combined.

Because of the limitations of the gimbal configuration on the aerial vehicle and the user's photographing needs, most of the camera movements realized by the previous QuickShot function are limited to photographing contents that is preset (for example: 5 to 6 camera movements), horizontal screen, and no gimbal action content. That is, the user cannot flexibly set the camera orientation (horizontal screen or vertical screen) or gimbal action (static or moving) during photographing while specifying the flight trajectory, and the gimbal action is relatively limited.

In addition, the previous flight trajectory is strongly bound to the gimbal direction or gimbal movement. For example, in the gradual distance mode, the aerial vehicle can fly along the oblique rear direction of the target, while the gimbal is fixed horizontally. At this time, the aerial vehicle cannot freely choose the gimbal movement for a certain flight trajectory, which brings certain restrictions and constraints to the user's creation.

(2) When the photographing information obtained by the aerial vehicle is played through a mobile terminal, the user's viewing experience is not good.

After obtaining the video photographed by the aerial vehicle, the video can be played and viewed through the mobile terminal. As users who watch videos on mobile social media platforms gradually become mainstream, handheld viewing of vertical screen video content has become a habit of a considerable proportion of viewers. Since the aerial vehicle's QuickShot mode only supports horizontal display, the original horizontally photographed content will have large black edges on the top and bottom of the screen when viewed in vertical mode. Compared with the original vertical content that can fill the screen, the viewing experience is somewhat discounted. When the horizontal screen content is cropped into vertical content, the loss of picture clarity is large, which also affects the viewing experience.

(3) The current camera movement effect does not fully highlight the contrast between the photographing subject and the environment.

When photographing, the camera effect of explaining the subject (person) first and then the environment can often meet the needs of users. For a target such as a single person, the outline of the target can be abstractly regarded as a vertical graphic. At this time, the target of the person is more suitable for display using a vertical format, while the environment is more suitable for display using a horizontal format. In the previous technical solution, a horizontal format is used for photographing. During the entire photographing process, the target occupies a smaller proportion of the screen, while the environment occupies a larger proportion of the screen, thereby failing to realize the effect of highlighting the target, and failing to form a sufficient sense of contrast with the composition when explaining the environment. Therefore, the photographing experience needs to be further improved.

(4) There is no solution for the image transmission display suitable for the horizontal-vertical switching of the gimbal.

When gimbal movements are applied to QuickShot photographing, there is currently no camera movement effect for gimbal movements such as "horizontal-vertical switching." For gimbal movements such as "horizontal-vertical switching," if the previous solution is directly used, when observing the screen content in the first person view (FPV) image transmission, the screen roll axis angle will not match the direction of the display screen, which will easily have a negative impact on the user's observation of the screen content.

The present disclosure provides a control method of an aerial vehicle (such as a UAV), an image display method, an aerial vehicle (such as a UAV), and a control terminal, to at least partially alleviate the above problems. The control method of the aerial vehicle may realize the decoupling control operation between the preliminary-flight trajectory and the gimbal orientation or gimbal action, such that the combination freedom between the preliminary-flight trajectory and the gimbal orientation and gimbal action is higher. The user may be able to freely match the flight trajectory and the gimbal orientation and action during photographing according to the environmental conditions and expected effects, to realize more arbitrary creation and richer film effects.

Further, the present disclosure may also realize a new QuickShot camera movement photographing. During the photographing process, the gimbal may be gradually rotated from vertical to horizontal, and, a vertical-to-horizontal photographing effect may be achieved by combined with the corresponding preliminary-flight trajectory. In this way, when the photographing information is played through the mobile terminal, a mobile-friendly viewing experience may be guaranteed, and at the same time, a strong visual contrast of "focusing on the photographing subject under the vertical screen and showing the wide environment under the horizontal screen" may be achieved, which improves the visual viewing effect of the film.

Also, the image display method provided by the present disclosure may realize a more convenient and quicker camera movement setting under any flight trajectory and a more natural and expected image transmission viewing experience, further improving the quality and effect of user viewing.

In conjunction with the accompanying drawings, some embodiments of the control method, image display method, aerial vehicle and control terminal of the present disclosure are described in detail below. In the case of no conflict between the embodiments, the following embodiments and the features in the embodiments can be combined with each other.

Figure 2:
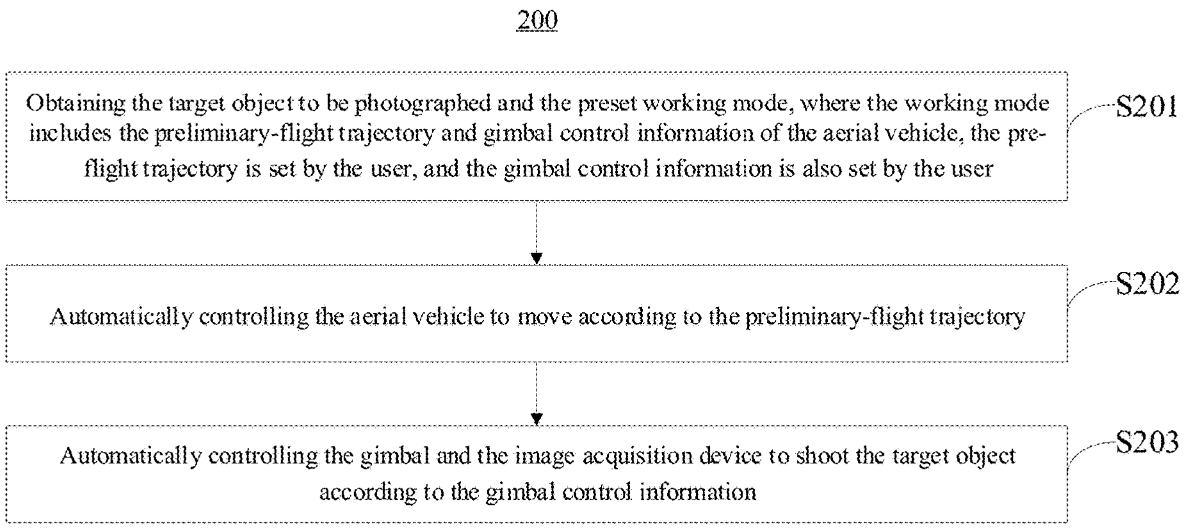
FIG. 2 is a flowchart of a control method for an aerial vehicle consistent with the present disclosure.

FIG. 1 is a schematic diagram showing the principle of a control method of an aerial vehicle provided by the present disclosure, and FIG. 2 is a flowchart of a control method 200 of an aerial vehicle provided by the present disclosure. Some or all aspects of the process 200 (or any other processes described herein, or variations and/or combinations thereof) may be performed by one or more processors onboard a movable object, a remote control device, any other system or device or a combination thereof. Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

As shown in FIG. 1 and FIG. 2, one embodiment of the present disclosure provides a control method of an aerial vehicle. The aerial vehicle may be connected to a control terminal for communication. To realize the QuickShot photographing function, the aerial vehicle may include a gimbal for carrying an image acquisition device, and the above-mentioned image acquisition device may be a camera, a video camera, a mobile phone with an image photographing function, a tablet computer or other equipment, etc. The gimbal may include a three-axis gimbal, and the three-axis gimbal may include a first motor for driving the image acquisition device to rotate around a first axis (yaw axis), a second motor for driving the image acquisition device to rotate around a second axis (roll axis) and a third motor for driving the image acquisition device to rotate around a third axis (pitch axis). It can be understood that the type of gimbal can be not only a three-axis gimbal but also a four-axis gimbal. For gimbals of different structural types, the gimbal may include different structural components. Those skilled in the art may set the specific structure included in the gimbal according to the specific gimbal type, which will not be repeated here.

The execution subject of the control method of the aerial vehicle may be a control device of the aerial vehicle, and the control device of the aerial vehicle may be integrated into the aerial vehicle. In this case, it may be considered that the control device of the aerial vehicle is implemented as the aerial vehicle. The control method 200 of the aerial vehicle may include:

S201: obtaining a target object to be photographed and a preset working mode, where the working mode includes a preliminary-flight trajectory and gimbal control information of the aerial vehicle, the preliminary-flight trajectory is set by the user, and the gimbal control information is also set by the user;

S202: automatically controlling the aerial vehicle to move according to the preliminary-flight trajectory;

S203: automatically controlling the gimbal and the image acquisition device to photograph the target object according to the gimbal control information.

In S201, the target object to be photographed and the preset working mode may be obtained. The working mode includes the preliminary-flight trajectory and the gimbal control information of the aerial vehicle. The preliminary-flight trajectory is set by the user, and the gimbal control information is also set by the user.

In one embodiment, the target object to be photographed may include at least one object that can be captured by the image acquisition device on the aerial vehicle. In some other embodiments, there may be multiple target objects to be photographed, and the multiple target objects may be regarded as a whole object to be photographed. The preset working mode may include a preset QuickShot mode or a QuickShot mode+gimbal action integrated mode. The integrated mode may include QuickShot mode-horizontal operation mode, QuickShot mode-vertical operation mode, QuickShot mode-horizontal to vertical operation mode, QuickShot mode-vertical to horizontal operation mode, etc. Regardless of the above-mentioned type of working mode, the above-mentioned working mode may include the preliminary-flight trajectory and the gimbal control information for controlling the aerial vehicle. The preliminary-flight trajectory may include a soaring trajectory, a circling trajectory, a spiral trajectory, etc. The gimbal control information may include yaw axis control parameters, pitch axis control parameters, roll axis control parameters, gimbal action parameters, etc. The gimbal action parameters may include horizontal photographing parameters, vertical photographing parameters, vertical to horizontal photographing parameters, horizontal to vertical photographing parameters, etc.

The preliminary-flight trajectory and gimbal control information included in the working mode may be set by the user. In one embodiment, the preliminary-flight trajectory may be set based on the user's first operation, and the gimbal control information may be set based on the user's second operation. The above-mentioned first operation and second operation may be different, thereby effectively enabling the user to separately configure the preliminary-flight trajectory and gimbal control parameters of the aerial vehicle according to application requirements and photographing requirements, thereby realizing the decoupling operation of the gimbal action and the preliminary-flight trajectory.

The present disclosure does not limit the specific implementation method of obtaining the target object to be photographed. In some embodiments, the target object to be photographed may be obtained based on automatic recognition of the image acquisition device or the object selection operation input by the user to the image acquisition device. In one embodiment, for example, obtaining the target object to be photographed may include: obtaining the acquisition screen of the image acquisition device on the aerial vehicle, and performing an automatic recognition operation of the target object based on the acquisition screen to determine the target object to be photographed. In another embodiment, for example, obtaining the target object to be photographed may include: obtaining the object selection operation input by the user for the acquisition screen, and determining the target object to be photographed based on the object selection operation. In some other embodiments, the target object to be photographed may be sent to the aerial vehicle by the control terminal. For example, in another embodiment, obtaining the target object to be photographed may include: receiving the target object to be photographed sent by the control terminal, such that the aerial vehicle stably obtains the target object to be photographed.

The present disclosure does not limit the specific implementation method of obtaining the preset working mode. In some embodiments, the preset working mode may be determined based on the model selection operation input by the user in the preset interface. In this case, obtaining the preset working mode may include: obtaining an interactive interface for configuring the working mode, determining the mode selection operation input by the user in the interactive interface, and determining the preset working mode based on the mode selection operation. In some other embodiments, the preset working mode may be the default working mode of the aerial vehicle. In this case, the preset working mode may be stored in a preset area. After the aerial vehicle is detected to be turned on, the preset working mode of the aerial vehicle may be obtained by accessing the preset area. In still some other embodiments, the preset working mode may be sent from the control terminal to the aerial vehicle. For example, obtaining the preset working mode may include: receiving the preset working mode sent by the control terminal, such that the aerial vehicle can stably obtain the preset working mode.

The target object to be photographed and the preset working mode may be acquired synchronously or asynchronously. When the target object to be photographed and the preset working mode are acquired asynchronously, the target object to be photographed may be acquired first, and then the preset working mode may be acquired. Alternatively, the preset working mode may be acquired first, and then the target object to be photographed may be acquired.

In S202, the aerial vehicle may be automatically controlled to move according to the preliminary-flight trajectory.

Since the working mode includes the preliminary-flight trajectory of the aerial vehicle, the preliminary-flight trajectory may be used to control the aerial vehicle to move. Therefore, after acquiring the preset working mode, the aerial vehicle may be automatically controlled to move based on the preliminary-flight trajectory included in the working mode.

In S203, the gimbal and the image acquisition device may be automatically controlled to photograph the target object according to the gimbal control information.

Since the working mode includes the gimbal control information, the gimbal control information may be used to control the gimbal and the image acquisition device on the gimbal. The gimbal control information may include: Yaw axis control parameters, Pitch axis control parameters, Roll axis control parameters, horizontal photographing parameters corresponding to the image acquisition device, vertical photographing parameters, vertical-to-horizontal photographing parameters, horizontal-to-vertical photographing parameters, etc. Therefore, after obtaining the preset working mode, the gimbal control information included in the working mode may be used to automatically control the gimbal and the image acquisition device to perform a photographing operation on the target object to be photographed. For example, in the process of controlling the flight of the aerial vehicle based on the preliminary-flight trajectory, the Yaw axis of the gimbal may be controlled to rotate based on the Yaw axis control parameters; the Pitch axis of the gimbal may be controlled to rotate based on the Pitch axis control parameters; and the Roll axis of the gimbal may be controlled to rotate based on the Roll axis control parameters. In some embodiments, automatically controlling the gimbal and the image acquisition device to photograph the target object according to the gimbal control information may include: controlling the roll axis (Roll axis) on the gimbal according to the gimbal control information such that the image acquisition device reaches the corresponding photographing mode (horizontal photographing mode, vertical photographing mode, horizontal-vertical switching photographing mode, preset angle photographing mode, etc.), and performing a photographing operation based on the achieved photographing mode. In this way, the aerial vehicle, the gimbal and the image acquisition device may be automatically decoupled and controlled, but also the photographing information corresponding to the target object may be obtained through the image acquisition device. The photographing information may include image information, video information, point cloud information, etc.

In the control method of the aerial vehicle provided by the present disclosure, the target object to be photographed and the preset working mode may be obtained. Since the working mode may include the preliminary-flight trajectory and the gimbal control information of the aerial vehicle, the aerial vehicle may be automatically controlled to move according to the preliminary-flight trajectory, and the gimbal and the image acquisition device may be automatically controlled to photograph the target object according to the gimbal control information, thereby effectively realizing the automatic decoupling control operation of the aerial vehicle, the gimbal and the image acquisition device. In this way, when performing photographing operations through the aerial vehicle, the photographing freedom may be higher, which may provide the user with a more flexible and rich photographing experience to bring more interesting and visually impactful film effects, and greatly enrich the photographing effects that can be achieved by the aerial vehicle.

Figure 3:
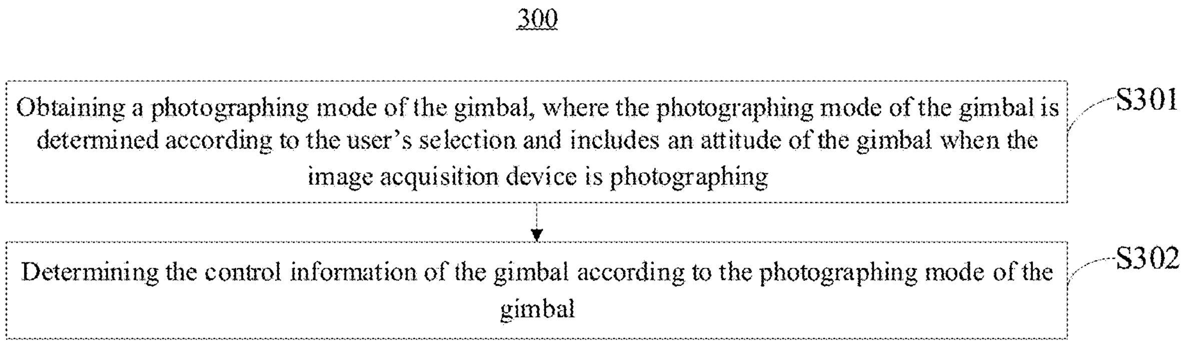
FIG. 3 is a flowchart of obtaining a preset working mode consistent with the present disclosure.

FIG. 3 is a flowchart of a process 300 for obtaining the preset working mode provided by an embodiment of the present disclosure. On the basis of the above embodiments, as shown in FIG. 3, since the working mode includes the gimbal control information and the gimbal control information may be set by the user, this embodiment provides an implementation method for the user to set the gimbal control information. In this embodiment, obtaining the preset working mode includes S301 and S302.

At S301, a photographing mode of the gimbal is obtained. The photographing mode may be determined based on the user's selection, and may include the attitude of the gimbal during photographing.

Multiple photographing modes that are able to control the gimbal may be pre-configured. The photographing mode may include at least any one of: horizontal photographing, vertical photographing, horizontal-vertical switching photographing, preset angle photographing, etc. The horizontal photographing may be used to enable the image acquisition device on the gimbal to perform the horizontal photographing operation. The vertical photographing may be used to enable the image acquisition device on the gimbal to perform the vertical photographing operation. The horizontal-vertical switching photographing may be used to enable the image acquisition device on the gimbal to perform the horizontal photographing operation at a first moment and the vertical photographing operation at a second moment, where the first moment is different from the second moment. The preset angle photographing may be used to enable the image acquisition device on the gimbal to perform photographing operation at a preset angle.

The user may select the photographing mode of the gimbal according to the photographing needs, and the photographing mode may include the attitude of the gimbal when photographing. In some embodiments, the user's selection may be determined based on the user's operation on the screen, and the screen may display all the photographing modes that the gimbal is able to realize.

Figure 4:
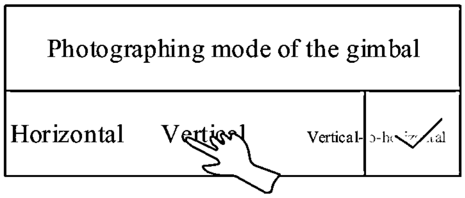
FIG. 4 is a schematic diagram showing obtaining a photographing mode of a gimbal consistent with the present disclosure.

For example, as shown in FIG. 4, all the photographing modes that the gimbal is able to realize are displayed on the screen, and all photographing modes may include the horizontal photographing mode, the vertical photographing mode, the vertical to horizontal switching photographing mode, the horizontal to vertical switching photographing mode, the preset angle photographing mode, etc. And then the user may perform a click or slide operation on any photographing mode on the screen, to determine the photographing mode of the gimbal. For example, the photographing mode of the gimbal may be determined to be the vertical photographing mode, etc.

In some other embodiments, the photographing mode of the gimbal may be associated with the preliminary-flight trajectory of the aerial vehicle. In this case, the user's selection may be determined based on the user's operation on the screen, and the screen may display photographing modes that match the preliminary-flight trajectory of the aerial vehicle.

Figure 5:
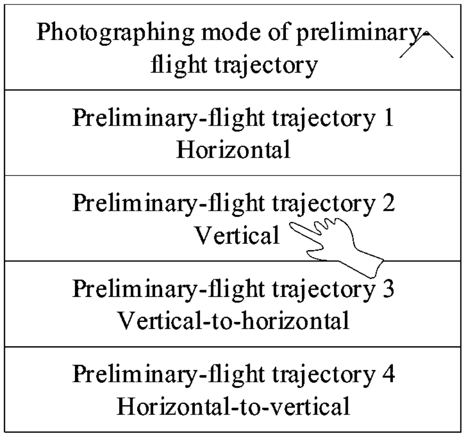
FIG. 5 is another schematic diagram showing obtaining a photographing mode of a gimbal consistent with the present disclosure.

For example, as shown in FIG. 5, the horizontal photographing mode corresponding to a preliminary-flight trajectory 1, the vertical photographing mode corresponding to a preliminary-flight trajectory 2, the vertical to horizontal photographing mode corresponding to a preliminary-flight trajectory 3, and the horizontal to vertical photographing mode corresponding to a preliminary-flight trajectory 4 are pre-configured. The user may perform a click or slide operation on the photographing mode of any preliminary-flight trajectory in the interface, to determine the photographing mode that matches the preliminary-flight trajectory of the aerial vehicle. For example, the photographing mode of the gimbal may be the vertical photographing mode corresponding to the preliminary-flight trajectory 2, and so on.

Further, for the preliminary-flight trajectory, the preliminary-flight trajectory of the aerial vehicle may be different in different application scenarios, and different preliminary-flight trajectories may correspond to the same or different photographing modes. In some examples, the distances between adjacent trajectory points in the preliminary-flight trajectory and the target object may be different, and the matching photographing modes may include horizontal-vertical switching photographing.

For example, the preliminary-flight trajectory of the aerial vehicle may include several trajectory points, and the formed preliminary-flight trajectory may be used to control the aerial vehicle. The distances of several trajectory points in the preliminary-flight trajectory to the target object may be the same or different. When the distances of the adjacent trajectory points in the preliminary-flight trajectory to the target object are the same, when the aerial vehicle is controlled to fly based on the preliminary-flight trajectory, the distances between the aerial vehicle and the target object at any time may be the same or approximately the same. When the distances from adjacent trajectory points in the preliminary-flight trajectory to the target object are different, when the aerial vehicle is controlled to fly based on the preliminary-flight trajectory, the distances between the aerial vehicle and the target object at any time may be different.

When the distances from the adjacent trajectory points in the preliminary-flight trajectory to the target object are different, the pre-configured photographing mode that matches the above-mentioned preliminary-flight trajectory may include horizontal-vertical switching photographing. The distances from the adjacent track points in the preliminary-flight trajectory to the target object are different, which may include that: the distances from the adjacent track points in the preliminary-flight trajectory to the target object gradually increase, or the distances from the adjacent track points in the preliminary-flight trajectory to the target object gradually decrease. The horizontal-vertical switching photographing mode may include: the vertical to horizontal photographing mode, or the horizontal to vertical photographing mode. Therefore, to improve and ensure the quality and effect of photographing the target object, in some instances, the distances from the adjacent track points in the preliminary-flight trajectory to the target object may gradually increase, and the matching photographing mode may include the vertical to horizontal photographing mode. In some other embodiments, the distances between the distances from the adjacent track points in the preliminary-flight trajectory to the target object may gradually decrease, and the matching photographing mode may include the horizontal to vertical photographing mode.

Figure 6:
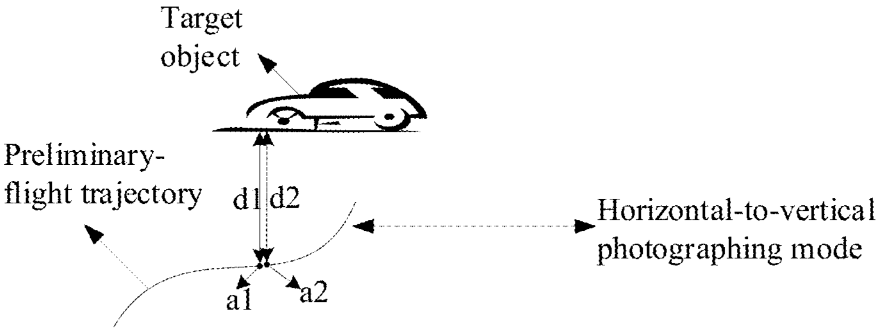
FIG. 6 is a schematic diagram showing a preliminary-flight trajectory and a target object consistent with the present disclosure.

For example, as shown in FIG. 6, the target object is a vehicle, the preliminary-flight trajectory includes adjacent trajectory points a1 and a2, the distance between trajectory point a1 and the vehicle is d1, and the distance between trajectory point a2 and the vehicle is d2, where $d2<d1$. That is, the distance from the adjacent trajectory points to the vehicle in the preliminary-flight trajectory at this time gradually decreases. At this time, to ensure the quality and effect of photographing the vehicle, the photographing mode of the gimbal may be determined to be the horizontal-to-vertical photographing mode.

Similarly, when the distance $d2>$the distance d1 (not shown in the figure), the photographing mode of the gimbal may be determined to be the vertical-to-horizontal photographing mode.

The photographing mode of the gimbal may be determined not only based on different preliminary-flight trajectories of the aerial vehicle, but also based on the characteristics of the target object in some other embodiments. At this time, the user's selection may be determined based on the user's operation on the screen, and the screen may display the photographing modes that match the target object.

Figure 7:
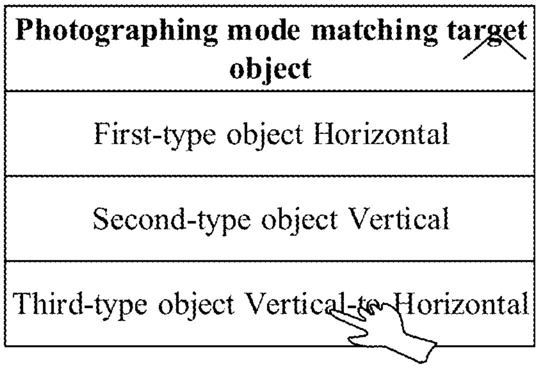
FIG. 7 is a schematic diagram showing a target object and a photographing mode of a gimbal consistent with the present disclosure.

As shown in FIG. 7, in one embodiment, for the target object, the type of the object may be determined based on the length and width of the target object in the display screen. For example, when the length of the target object is less than the width, the target object may be determined to be a first type of object; when the length of the target object is greater than the width, the target object may be determined to be a second type of object; and when the length and width of the target object are similar, the target object may be determined to be a third type of object.

For different types of the target object, the photographing modes that match the different types of the target object may be pre-configured. For example: the photographing mode that matches the first type of object may be the horizontal photographing mode, the photographing mode that matches the second type of object may be the vertical photographing mode, the photographing mode that matches the third type of object may be the horizontal-vertical switching photographing mode, and so on. The user may perform a click or slide operation on one photographing mode that matches any type of the object in the interface, to determine the photographing mode that matches the target object. For example, when the target object is the third type of target object, the photographing mode of the gimbal may be determined to be the vertical-to-horizontal photographing mode corresponding to the third type of the object.

When controlling the aerial vehicle to photograph the target object, to improve the quality and effect of the photographing, in addition to being able to display the photographing mode that matches the target object on the screen, the aerial vehicle may also recommend a matching photographing mode to the user based on the length and width of the target object on the screen.

The length and width of the target object on the screen may include the length and width of the outline of the identified target object on the screen, or the length and width of the selection identification box of the target object selected by the user. After obtaining the length and width of the target object on the screen, a matching photographing mode may be recommended to the user based on the length and width of the target object on the screen.

In some embodiments, when the aspect ratio of the target object is greater than a first threshold, the matching photographing mode may include the horizontal photographing; when the aspect ratio of the target object is less than a second threshold, the matching photographing mode may include the vertical photographing; and when the aspect ratio of the target object is greater than or equal to the second threshold and less than or equal to the first threshold, the matching photographing mode may include the horizontal-vertical switching photographing.

Figure 8:
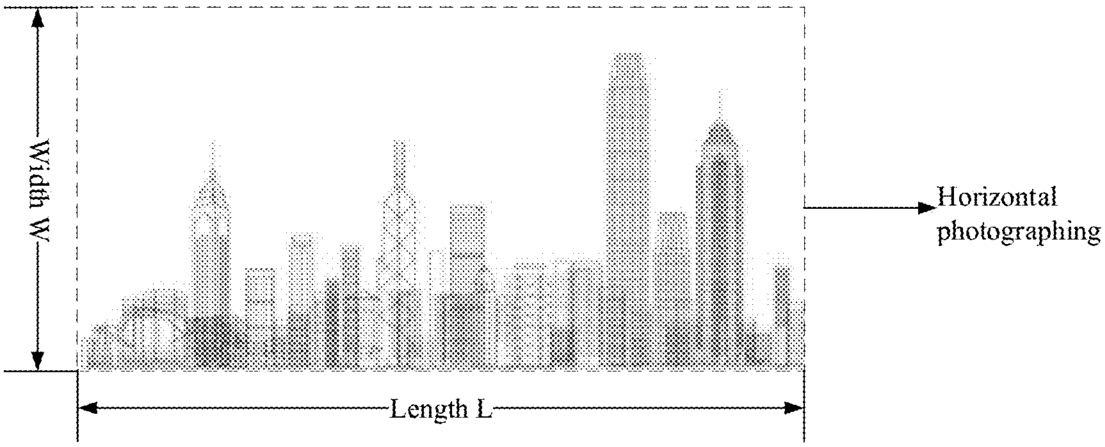
FIG. 8 is a schematic diagram showing recommending matching photographing modes to a user, consistent with the present disclosure.

For example, as shown in FIG. 8, taking the length and width of the selection identification box of the target object selected by the user as the length and width of the target object as an example, when the target object is a building, the length L and width W of the building may be obtained, and then the aspect ratio L/W of the building may be obtained. L/W may be analyzed and compared with the pre-configured first threshold and second threshold. When the aspect ratio L/W is greater than the first threshold, the length of the building is greater than the width. At this time, to ensure the quality and effect of photographing the building, the photographing mode of the gimbal may be determined to be the horizontal photographing mode.

Figure 9:
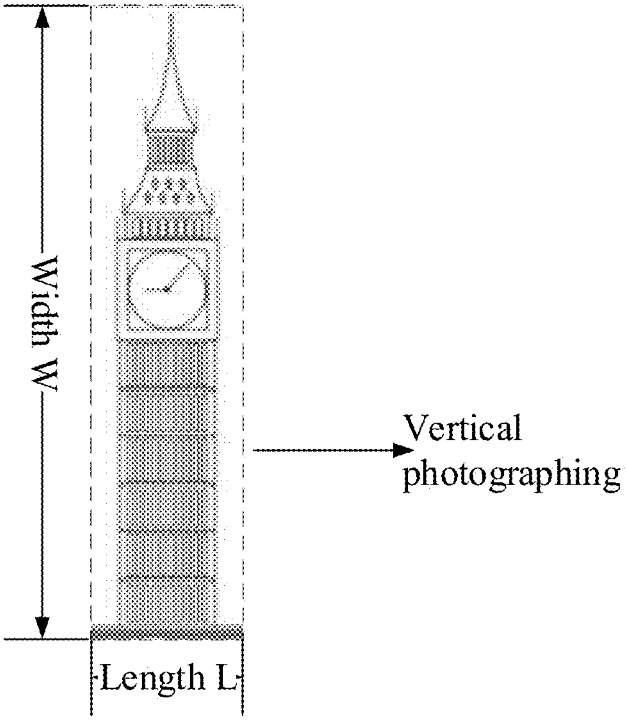
FIG. 9 is another schematic diagram showing recommending matching photographing modes to a user, consistent with the present disclosure.

For another example, as shown in FIG. 9, when the target object is a clock tower, the length L and width W of the clock tower may be obtained, and then the aspect ratio L/W of the clock tower may be obtained. L/W may be analyzed and compared with the pre-configured first threshold and second threshold. When the aspect ratio L/W is less than the second threshold, where the second threshold is less than the first threshold, it means that the width of the clock tower is greater than the length. At this time, to ensure the quality and effect of photographing the clock tower, the photographing mode of the gimbal may be determined to be the vertical photographing mode.

In addition to determining the photographing mode of the gimbal based on the characteristic reference dimension of the aspect ratio, the photographing mode of the gimbal may also be directly determined based on the size relationship between the length and width of the target object in some other embodiments. At this time, when the length of the target object is greater than the width, the matching photographing mode may include the horizontal photographing, vertical photographing, or the horizontal-vertical switching photographing; and when the length of the target object is less than or equal to the width, the matching photographing mode may include the vertical photographing.

For example, taking the length and width of the selection identification box of the target object selected by the user as the length and width of the target object as an example, after obtaining the length L and width W of the target object, the length and width may be analyzed and compared. When the length of the target object is greater than the width, it means that the target object is relatively long. At this time, to ensure the quality and effect of photographing the target object, the photographing mode of the gimbal may be determined as the horizontal photographing mode, the vertical photographing mode, or the horizontal-vertical switching photographing mode. When the length of the target object is less than or equal to the width, it means that the target object is relatively wide, or the length of the target object is equal to the width. At this time, the photographing mode of the gimbal may be determined to be the vertical photographing mode.

Through the above implementation method, it may be effectively realized that different gimbal photographing modes may be determined based on target objects with different size characteristics, which effectively ensures the quality and effect of obtaining the photographing mode of the gimbal.

At S302, the gimbal control information is determined according to the gimbal photographing mode.

After obtaining the gimbal photographing mode, the gimbal control information may be determined according to the gimbal photographing mode, where different gimbal control information may be determined for different gimbal photographing modes.

In some embodiments, the gimbal control information may be related to the gimbal photographing mode as well as the photographing duration information of the user wanting to photograph the target object. At this time, determining the gimbal control information according to the gimbal photographing mode in this embodiment may include: obtaining a preliminary-photographing duration; determining the gimbal control information according to the preliminary-photographing duration and the photographing mode.

To accurately determine the gimbal control information, the preliminary-photographing duration may be obtained first, and the preliminary-photographing duration may be determined based on the user's configuration operation or input operation. After obtaining the preliminary-photographing duration, the preliminary-photographing duration and the photographing mode may be analyzed and processed to determine the gimbal control information.

In addition, this embodiment does not limit the implementation method of determining the gimbal control information according to the preliminary-photographing duration and the photographing mode. In some embodiments, a machine learning model for determining the gimbal control information may be pre-trained. After obtaining the preliminary-photographing duration and the photographing mode, the preliminary-photographing duration and the photographing mode may be input into the machine learning model, and then the gimbal control information output by the machine learning model may be obtained.

In some other embodiments, determining the gimbal control information according to the preliminary-photographing duration and the photographing mode may include: when the photographing mode is the horizontal-vertical switching photographing, determining the corresponding durations of the vertical photographing, horizontal-vertical switching photographing, and horizontal photographing, of the gimbal, according to the preliminary-photographing duration; determining the gimbal control information based on the corresponding durations of the vertical photographing, horizontal-vertical switching photographing, and horizontal photographing, of the gimbal.

When the photographing mode is the horizontal-vertical switching photographing mode, the horizontal-vertical switching photographing mode may correspond to the three stages of the gimbal, namely the vertical photographing stage of the gimbal, the horizontal-vertical switching photographing stage, and the horizontal photographing stage. Since the total duration of the preliminary-photographing duration is limited, to accurately realize the photographing operation of the target object in the horizontal-vertical switching photographing mode, after obtaining the preliminary-photographing duration, the preliminary-photographing duration may be analyzed and processed to determine the corresponding duration of the vertical photographing, the horizontal-vertical switching photographing, and the horizontal photographing of the gimbal.

In some embodiments, the preliminary-photographing duration may be divided into three equal parts to determine the duration corresponding to the vertical photographing, the horizontal-vertical switching photographing, and the horizontal photographing of the gimbal. In this case, the durations corresponding to the vertical photographing, the horizontal-vertical switching photographing, and the horizontal photographing of the gimbal may be the same.

In some other embodiments, the preliminary-photographing duration may be randomly divided into three durations, and then the three durations may be determined as the durations corresponding to the vertical photographing, the horizontal-vertical switching photographing, and the horizontal photographing of the gimbal. In this case, determining the durations corresponding to the vertical photographing, the horizontal-vertical switching photographing, and the horizontal photographing of the gimbal according to the preliminary-photographing duration in this embodiment may include: determining a first preset duration in the preliminary-photographing duration as the duration corresponding to the vertical photographing; determining a second preset duration in the preset photographing duration information as the duration corresponding to the vertical-horizontal switching photographing; and determining a third preset duration in the preset photographing duration information as the duration corresponding to the horizontal photographing. The first preset duration, the second preset duration, and the third preset duration may constitute the preset photographing duration. The first preset duration, the second preset duration, and the third preset duration may be the same or different. As can be seen from the above, the durations corresponding to the vertical photographing, horizontal-vertical switching photographing, and horizontal photographing of the gimbal may be the same or different.

After obtaining the durations corresponding to the vertical photographing, horizontal-vertical switching photographing, and horizontal photographing of the gimbal, the gimbal control information may be determined based on the durations corresponding to the vertical photographing, horizontal-vertical switching photographing, and horizontal photographing of the gimbal, thereby effectively achieving stable reliability in determining the gimbal control information.

In some embodiments, the gimbal control information may be related to the photographing mode and photographing duration information of the gimbal as well as the distance information of the preliminary-flight of the aerial vehicle. In this case, determining the gimbal control information according to the photographing mode of the gimbal may include: obtaining the preliminary-flight distance information of the aerial vehicle; and determining the gimbal control information based on the distance information and the photographing mode.

In one embodiment, to accurately determine the gimbal control information, the preliminary-flight distance information of the aerial vehicle may be obtained first. The distance information is not the straight-line distance between the aerial vehicle and the target object, but may be the distance information that the aerial vehicle needs to move when controlling the flight of the aerial vehicle based on the preliminary-flight trajectory. In addition, the preliminary-flight distance information of the aerial vehicle may be determined based on the configuration operation or input operation of the user. After obtaining the preliminary-flight distance information of the aerial vehicle, the preliminary-flight distance information and the photographing mode of the aerial vehicle may be analyzed and processed to determine the gimbal control information.

When the photographing mode is the horizontal-vertical switching photographing mode, the horizontal-vertical switching photographing mode may correspond to the three stages of the gimbal, namely the vertical photographing stage, the horizontal-vertical switching photographing stage, and the horizontal photographing stage of the gimbal. Since the total distance of the distance information of the aerial vehicle's preliminary-flight is limited, to accurately realize the photographing operation of the target object in the horizontal-vertical switching photographing mode, after obtaining the distance information of the aerial vehicle's preliminary-flight, the distance information may be analyzed and processed to determine the distance information corresponding to the vertical photographing, the horizontal-vertical switching photographing, and the horizontal photographing of the gimbal, respectively. In some embodiments, the distance information may be divided into three equal parts to determine the distance information corresponding to the vertical photographing, the horizontal-vertical switching photographing, and the horizontal photographing of the gimbal. At this time, the distance information corresponding to the vertical photographing, the horizontal-vertical switching photographing, and the horizontal photographing of the gimbal may be the same.

In some other embodiments, the distance information may be randomly divided into three distance segments, and then the three distance segments may be determined as the distance information corresponding to the vertical photographing, horizontal-vertical switching photographing, and horizontal photographing of the gimbal respectively. At this time, the distance information corresponding to the vertical photographing, horizontal-vertical switching photographing, and horizontal photographing of the gimbal may be determined by: determining a first distance segment in the distance information of the aerial vehicle preliminary-flight as the distance information corresponding to the vertical photographing; determining a second distance segment in the preset photographing time information as the distance information corresponding to the vertical-horizontal switching photographing; and determining a third distance segment in the preset photographing time information as the distance information corresponding to the horizontal photographing. The first distance segment, the second distance segment, and the third distance segment may constitute the distance information of the preliminary-flight of the aerial vehicle. The first distance segment, the second distance segment, and the third distance segment may be the same or different. As can be seen from the above, the distance information corresponding to the vertical photographing, horizontal-vertical switching photographing, and horizontal photographing of the gimbal may be the same or different.

In some other embodiments, the gimbal control information may be related to the gimbal photographing mode, photographing duration information, and preliminary-flight distance information of the aerial vehicle, and may also be related to the proportion information of the target object in the picture. In this case, determining the gimbal control information according to the gimbal photographing mode may include: obtaining the proportion information of the target object in the picture; and determining the gimbal control information based on the proportion information and the photographing mode.

To accurately determine the gimbal control information, the proportion information of the target object in the picture may be obtained first, and the proportion information of the target object in the picture may change as the photographing operation of the target object is performed. The proportion information of the target object in the picture may be determined based on the size information of the target object in the picture. When the size information of the target object in the picture is large, the proportion information of the target object in the picture may be large, and when the size information of the target object in the picture is small, the proportion information of the target object in the picture may be small.

After obtaining the proportion information of the target object in the picture, the proportion information and the photographing mode may be analyzed and processed to determine the gimbal control information. The specific implementation method for determining the gimbal control information may be similar to the above-mentioned determination of the gimbal control information based on the duration information, and is not limited.

In some other embodiments, based on the proportion information and the photographing mode, determining the gimbal control information may include that: when the proportion information is greater than a first proportion threshold, it may mean that the display size of the target object in the picture at this time is relatively large, the photographing mode may be determined as the horizontal photographing mode based on the proportion information, and then the gimbal control information may be determined based on the horizontal photographing mode and the proportion information; and, when the proportion information is less than or equal to the first proportion threshold, it may mean that the display size of the target object in the picture at this time is relatively small, the photographing mode may be determined as the vertical photographing mode based on the proportion information, and then the gimbal control information may be determined based on the vertical photographing mode and the proportion information, thereby effectively ensuring the accuracy and reliability of determining the gimbal control information.

In this embodiment, by obtaining the photographing mode of the gimbal, and then determining the gimbal control information according to the photographing mode of the gimbal, not only the accuracy and reliability of determining the gimbal control information may be guaranteed, but also the quality and efficiency of controlling the gimbal and the image acquisition device based on the gimbal control information may be improved, and the practicality of the method may be further improved.

In some embodiment, the method may further include: generating corresponding photographed videos based on the content captured by the image acquisition device. Different working modes and gimbal control information may generate photographed videos with different effects, and the photographed videos may include: horizontally photographed videos, vertically photographed videos, horizontal-to-vertical photographed videos, vertical-to-horizontal photographed videos, etc. The user's photographing needs may be satisfied, which is conducive to improving the flexibility and reliability of the application of the method.

When the video is photographed from a horizontal to a vertical format or from a vertical to a horizontal format, since the video image amplitude in the photographed video needs to be switched, to ensure the quality and effect of displaying the photographed video, when playing the photographed video, the user may be reminded to rotate the display used to play the photographed video. In some embodiments, generating the corresponding photographed video based on the content photographed by the image acquisition device may include: obtaining an original video which is obtained by the image acquisition device based on horizontal photographing, vertical photographing, or horizontal-vertical switching photographing; when the original video roughly switches between horizontal and vertical formats, adding a rotation prompt icon to generate the target video to prompt the user to rotate the display device when watching the target video.

During rough horizontal-vertical switching of the original video may mean during switching of the horizontal and vertical formats in the original video, or during a preset time period (1 s, 2 s or 5 s, etc.) before the horizontal-vertical formats in the original video are switched. In addition, the added rotation prompt icon may be displayed in a floating manner, a floating window manner, or a pop-up window manner, as long as the added rotation prompt icon is able to be displayed during the playback of the target video roughly when the horizontal and vertical formats of the original video are switched, such that the user is able to rotate the display device through the displayed rotation prompt icon.

In one embodiment, after automatically controlling the gimbal and the image acquisition device to photograph the target object according to the gimbal control information, the aerial vehicle may directly obtain the original video through the image acquisition device, and the original video may include a horizontal video frame obtained by the horizontal photographing operation, a vertical video frame obtained by the vertical photographing, and a switching video frame obtained by the horizontal-vertical switching photographing. After obtaining the original video, the aerial vehicle may add the rotation prompt icon when the horizontal-vertical formats in the original video are roughly switched to generate the target video. The added rotation prompt icon may be used to prompt the user to rotate the display device when watching the target video, such that the target video displayed by the display device is always in the correct orientation, thereby improving the quality and effect of displaying the target video.

The target video generation subject can be not only an aerial vehicle, but also the control terminal in some other embodiments. When the control terminal is able to generate a target video with a rotation prompt icon, the method may also include: obtaining the original video which is obtained by the image acquisition device based on horizontal photographing, vertical photographing, or horizontal-vertical switching photographing; sending the original video to the control terminal to generate the target video using the control terminal, where the target video is generated based on the original video.

In one embodiment, after automatically controlling the gimbal and the image acquisition device to photograph the target object according to the gimbal control information, the aerial vehicle may directly obtain the original video through the image acquisition device, and the original video may include the horizontal video frame obtained through the horizontal photographing operation, the vertical video frame obtained through the vertical photographing operation, and the switching video frame obtained through the horizontal-vertical switching photographing.

After obtaining the original video, to generate the target video with the rotation prompt icon, the aerial vehicle may send the original video to the control terminal. After the control terminal obtains the original video, since the original video may include the banner video frame obtained through banner photographing, the vertical video frame obtained through vertical photographing, or the switching video frame obtained through horizontal-vertical switching photographing, to ensure the quality and effect of playing the photographed video, the control terminal may add the rotation prompt icon when the original video roughly switches between horizontal and vertical to generate the target video. The added rotation prompt icon may be used to prompt the user to rotate the display device when watching the target video, which may ensure that the target video displayed by the display device is always in the correct orientation, thereby improving the quality and effect of displaying the target video.

In the present disclosure, the corresponding captured video may be generated based on the content captured by the image acquisition device, which may meet the user's needs for capturing the target object. In addition, when the captured video is obtained based on the banner photographing, vertical photographing, and horizontal-vertical switching photographing, the rotation prompt icon may be added to the captured video through the aerial vehicle or the control terminal to obtain the target video, thereby effectively ensuring the stability and reliability of the generation of the target video. In addition, based on the added rotation prompt icon, the user may be reminded to adjust the display device in a timely manner during the playback of the target video to ensure that the target video displayed by the display device is always in the correct orientation, thereby further improving the quality and effect of displaying the target video.

Figure 10:
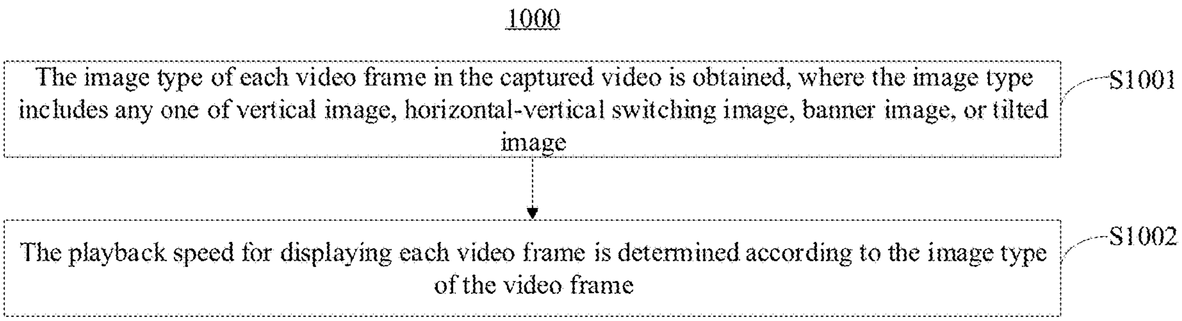
FIG. 10 is a flowchart of another control method of an aerial vehicle consistent with the present disclosure.

In another embodiment in FIG. 10 which is a flowchart of another control method 1000 of the aerial vehicle, based on the above embodiments, in the process of controlling the aerial vehicle, the captured video may be obtained through the image acquisition device. To further improve the practicality of the method, this embodiment provides an implementation method for configuring the playback speed of the captured video. The method 1000 in this embodiment may also include S1001 to S1002.

At S1001: the image type of each video frame in the captured video is obtained, where the image type includes any one of vertical image, horizontal-vertical switching image, banner image, or tilted image.

After the captured video is obtained through the image acquisition device, to enable the captured video to meet the playback requirements of different users, the image type of each video frame in the captured video may be obtained. The image type may include any one of vertical image, horizontal-vertical switching image, banner image, or tilted image. The vertical image is an image obtained by performing a vertical photographing operation through the image acquisition device, the horizontal-vertical switching image is an image obtained by performing a horizontal-vertical switching photographing operation through the image acquisition device, the banner image is an image obtained by performing a banner photographing operation through the image acquisition device, and the tilted image is an image obtained by performing a photographing operation at a preset angle through the image acquisition device.

The present disclosure does not limit the implementation method for obtaining the image type of each video frame in the captured video. In some embodiments, obtaining the image type corresponding to each video frame in the captured video may include: obtaining the image type identifier corresponding to each video frame in the captured video, and determining the image type of each video frame in the captured video based on the image type identifier. In some other embodiments, obtaining the image type corresponding to each video frame in the captured video may include: obtaining the display angle of the target object in each video frame in the captured video relative to the display device, and determining the image type corresponding to each video frame in the captured video based on the display angle, thereby effectively ensuring the accuracy and reliability of obtaining the image type of each video frame in the captured video.

At S1002, the playback speed for displaying each video frame is determined according to the image type of the video frame.

After the image type is obtained, the image type may be analyzed and processed to determine the playback speed for displaying the video frame. In some embodiments, a mapping relationship between different image types and playback speeds may be preconfigured, and then the playback speed for displaying each video frame may be determined based on the image type of the video frame and the mapping relationship. For example, when the image type is the vertical image, a first speed for displaying the vertical image may be determined based on the mapping relationship and the vertical image; when the image type is the banner image, a second speed for displaying the banner image may be determined based on the mapping relationship and the banner image, and so on. In other embodiments, according to the image type of the video frame, determining the playback speed for displaying the video frame may include: when the image type of the video frame is one of a vertical image, a horizontal-vertical switching image, or a tilted image, determining the playback speed for displaying the video frame to be the first speed; when the image type is a banner image, dividing all banner images into a front image set and a rear image set, determining the playback speed of each video frame in the front image set to be the second speed, and the playback speed of each video frame in the rear image set to be the first speed. The second speed may be larger than the first speed.

In this embodiment, by obtaining the image type of each video frame in the captured video and then determining the playback speed for displaying each video frame according to the image type of the video frame, it may be effectively achieved that after the captured video is acquired, the playback speed of the captured video may be configured based on the video frames of different image types in the captured video, and then the captured video may be played based on the configured playback speed, thereby meeting the different playback requirements of different users for the captured video, and further improving the flexibility and reliability of the application of the method.

Figure 11:
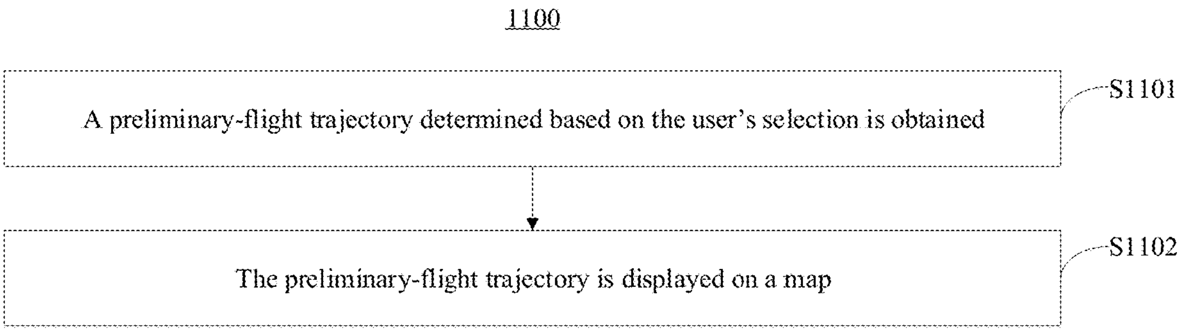
FIG. 11 is a flowchart of another control method of an aerial vehicle consistent with the present disclosure.

In another embodiment in FIG. 11 which is a flowchart of another control method 1101 of the aerial vehicle, based on the above embodiments, in the process of controlling the aerial vehicle, to satisfy the user's need to timely understand the real-time operating status of controlling the aerial vehicle, the method 1101 in this embodiment may further include S1101 to S1102.

At S1101: a preliminary-flight trajectory determined based on the user's selection is obtained.

Figure 12:
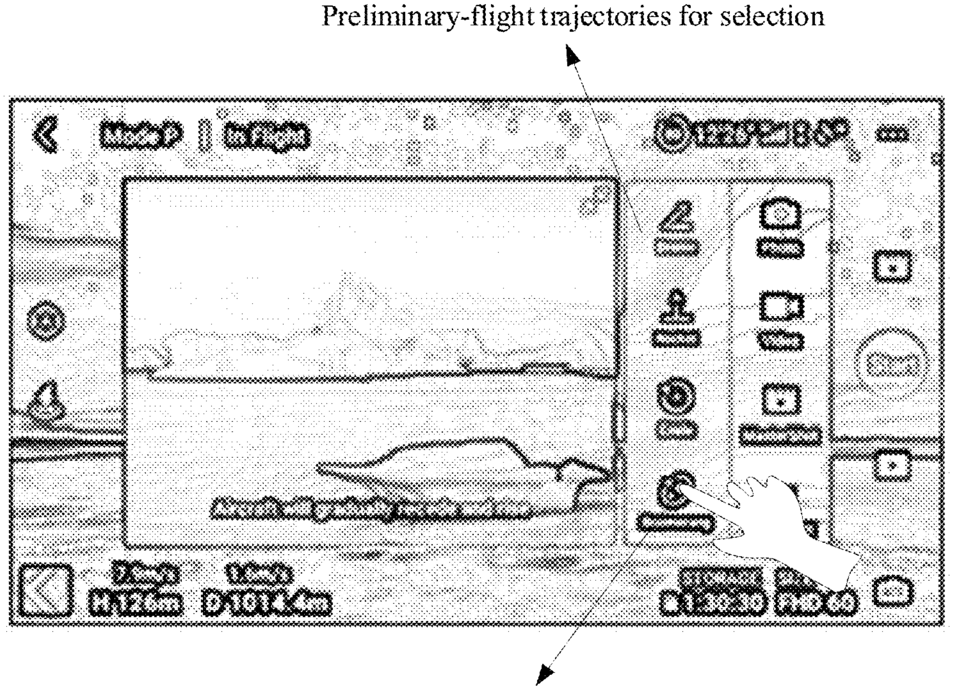
FIG. 12 is a schematic diagram showing obtaining a preliminary-flight trajectory according to a user's selection, consistent with the present disclosure.

To control the aerial vehicle, the preliminary-flight trajectory determined based on the user's selection may be obtained first. In some embodiments, obtaining the preliminary-flight trajectory determined based on the user's selection may include: obtaining a selection page for the preliminary-flight trajectory, where the selection page may display multiple selectable preliminary-flight trajectories. As shown in FIG. 12, the multiple preliminary-flight trajectories may include: a soaring flight trajectory, an inclined flight trajectory, a circling flight trajectory, a spiral flight trajectory, etc., and the multiple preliminary-flight trajectories may be selectable trajectories in a preset working mode, and different working modes may correspond to different selectable trajectories. Then, the selection operation input by the user in the selection page may be obtained, and the preliminary-flight trajectory may be determined based on the selection operation. When the user selects the spiral flight trajectory, the preliminary-flight trajectory used to control the aerial vehicle may be determined to be the spiral flight trajectory. Since the above-mentioned preliminary-flight trajectory is determined based on the user's selection operation, the preliminary-flight trajectory may meet the different control requirements of different users for the aerial vehicle.

In other embodiments, obtaining the preliminary-flight trajectory determined based on the user's selection may include: obtaining a configuration page of the preliminary-flight trajectory, in which a plurality of controls for editing the preliminary-flight trajectory may be displayed, and the plurality of controls may include: a straight line control, a curve control, a circular control, an elliptical control, a curvature control, etc.; obtaining the configuration operation entered by the user in the configuration page and determining the preliminary-flight trajectory based on the configuration operation. When the user configures the soaring flight trajectory, the preliminary-flight trajectory used to control the aerial vehicle may be determined to be the soaring flight trajectory. At this time, the preliminary-flight trajectory may also be considered to be determined based on the user's selection operation, to meet the different control requirements of different users for the aerial vehicle.

At S1102, the preliminary-flight trajectory is displayed on a map.

After obtaining the preliminary-flight trajectory determined based on the user's selection, the preliminary-flight trajectory may be displayed on a map to enable the user to understand and view the determined preliminary-flight trajectory. When the preliminary-flight trajectory is displayed on the map, the flown trajectory segments and the unflown trajectory segments included in the preliminary-flight trajectory may be obtained. For the flown trajectory segments and the unflown trajectory segments, the flown trajectory segments and the unflown trajectory segments may be displayed in different display modes on the map. For example: the flown trajectory segments may be displayed in gray on the map, and the unflown trajectory segments may be displayed in green, etc., such that the user is able to intuitively view the operating status of the preliminary-flight trajectory of the aerial vehicle.

Figure 13:
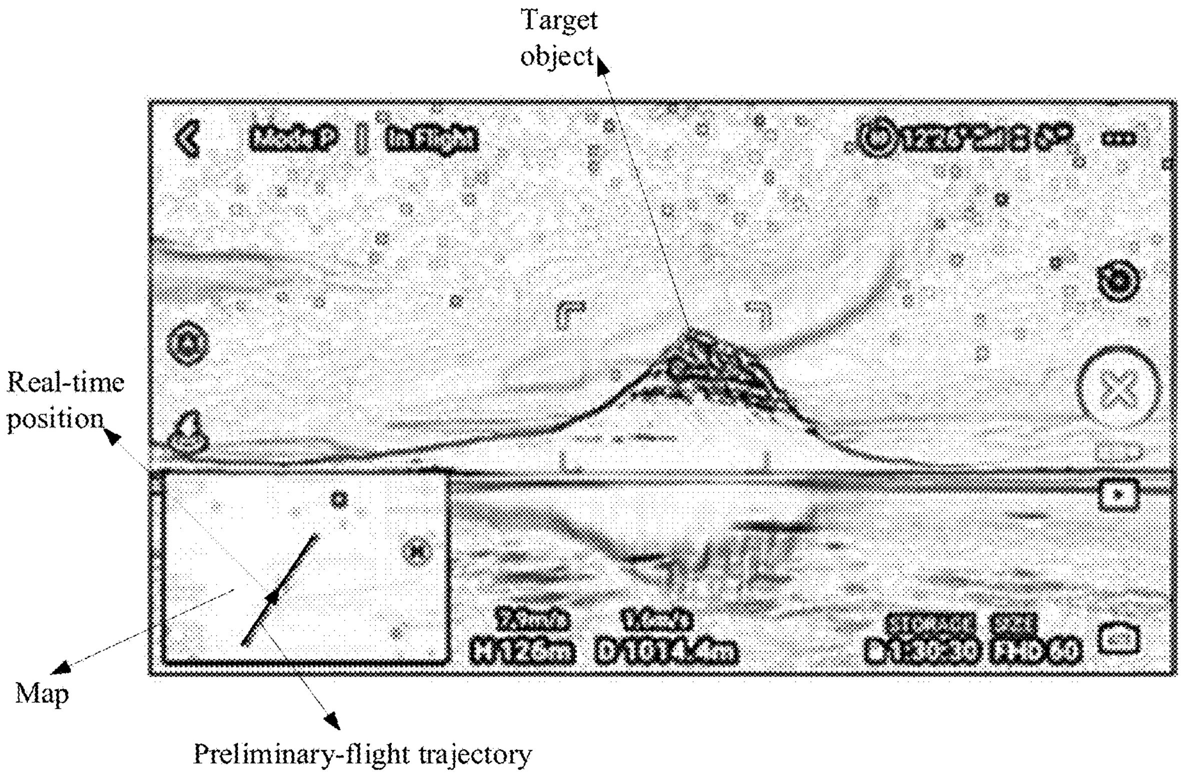
FIG. 13 is a schematic diagram showing displaying a preliminary-flight trajectory on a map, consistent with the present disclosure.

In some other embodiments, displaying the preliminary-flight trajectory on the map may include: obtaining the real-time location of the aerial vehicle; and displaying the real-time location of the aerial vehicle and the preliminary-flight trajectory on the map. For example, in one embodiment, when the preliminary-flight trajectory is obtained and the aerial vehicle is controlled based on the preliminary-flight trajectory, the real-time location of the aerial vehicle may be obtained through the real-time positioning device on the aerial vehicle, and then the real-time position and preliminary-flight trajectory of the aerial vehicle may be displayed on the map. As shown in FIG. 13, when the target object is a mountain to be photographed, after the preliminary-flight trajectory is obtained, the aerial vehicle may be controlled to move based on the preliminary-flight trajectory. When the aerial vehicle is controlled based on the preliminary-flight trajectory, a map thumbnail may be displayed in the lower left corner of the display screen. In the map thumbnail, not only the preliminary-flight trajectory used to control the aerial vehicle may be displayed, but also the real-time position of the aerial vehicle may be displayed. For example, the real-time position of the aerial vehicle may be marked by an arrow, such that the user is able to intuitively view the real-time position and preliminary-flight trajectory of the aerial vehicle through the map.

In this embodiment, by obtaining the preliminary-flight trajectory determined based on the user's selection and then displaying the preliminary-flight trajectory on the map, the user may intuitively view the real-time position and preliminary-flight trajectory of the aerial vehicle through the map, which further improves the practicality of the method.

Figure 14:
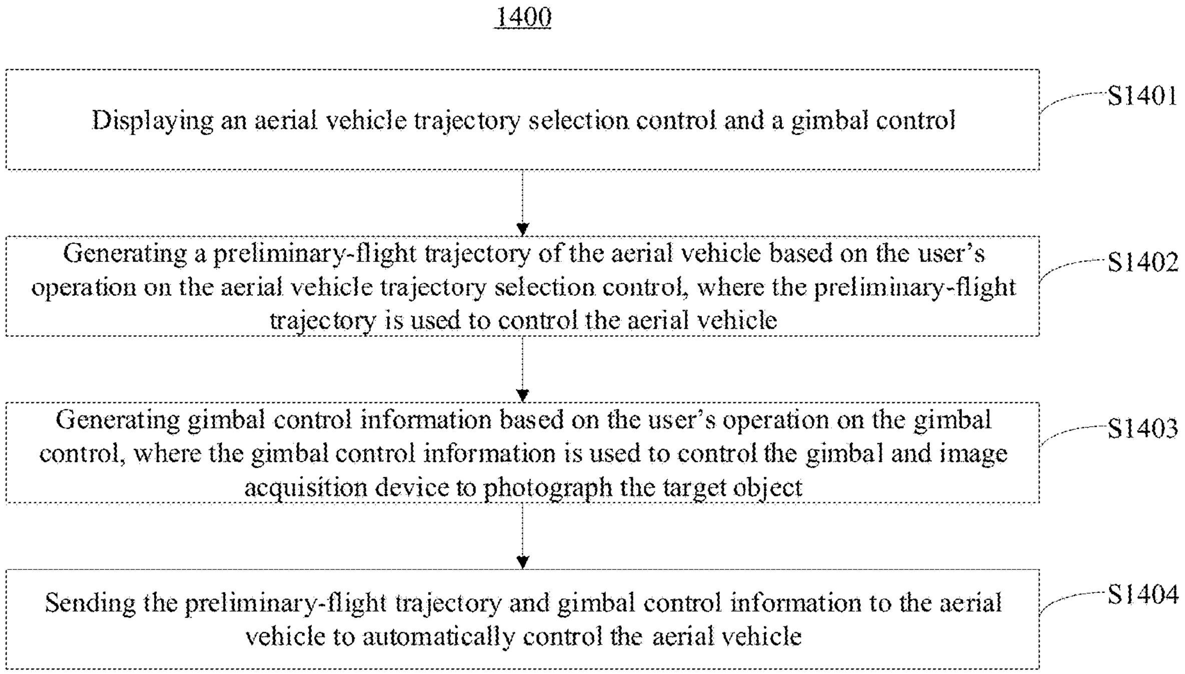
FIG. 14 is a flowchart of another control method of an aerial vehicle consistent with the present disclosure.

In another embodiment in FIG. 14, which is a flowchart of another control method 1400 of the aerial vehicle, the execution subject of the control method may be a control device of the aerial vehicle. For example, the control device of the aerial vehicle may be implemented as a control terminal, that is, the control method may be applied to the control terminal, and the control terminal may be used to control the aerial vehicle. To realize the QuickShot function, the aerial vehicle may include a gimbal for carrying an image acquisition device, where the image acquisition device may be a camera, a video camera, a mobile phone with an image photographing function, a tablet computer or other devices, etc. The gimbal may include a three-axis gimbal, and the three-axis gimbal may include a first motor for driving the image acquisition device to rotate around a first axis (yaw axis), a second motor for driving the image acquisition device to rotate around a second axis (roll axis), and a third motor for driving the image acquisition device to rotate around a third axis (pitch axis). It can be understood that the type of the gimbal may be not only a three-axis gimbal, but also a four-axis gimbal. For gimbals of different structural types, the gimbal may also include different structural components. Those skilled in the art may set the specific structure of the gimbal according to the specific gimbal type, which will not be repeated here.

In the Embodiment Shown in FIG. 14, the Control Method 1400 of the Aerial Vehicle Includes:

- S1401: displaying an aerial vehicle trajectory selection control and a gimbal control;
- S1402: generating a preliminary-flight trajectory of the aerial vehicle based on the user's operation on the aerial vehicle trajectory selection control, where the preliminary-flight trajectory is used to control the aerial vehicle;
- S1403: generating gimbal control information based on the user's operation on the gimbal control, where the gimbal control information is used to control the gimbal and image acquisition device to photograph the target object; and
- S1404: sending the preliminary-flight trajectory and gimbal control information to the aerial vehicle to automatically control the aerial vehicle.

At S1401, the aerial vehicle trajectory selection control and the gimbal control are displayed.

To control the aerial vehicle, the display interface of the control terminal may display the aerial vehicle trajectory selection controls and gimbal controls. The aerial vehicle trajectory selection control may be used for users to select to obtain the preliminary-flight trajectory for controlling the aerial vehicle. In some embodiments, one or more aerial vehicle trajectory selection controls may be displayed. When the number of aerial vehicle trajectory selection controls is multiple, different aerial vehicle trajectory selection controls may correspond to different types of preliminary-flight trajectories.

For the gimbal control, the gimbal controls may be used for users to select to obtain the gimbal control information for controlling the gimbal and image acquisition device on the aerial vehicle. In some embodiments, one or more gimbal controls may be displayed. When the number of the gimbal controls is multiple, different gimbal controls may correspond to different gimbal control information.

The present disclosure does not limit the specific implementation of displaying the aerial vehicle trajectory selection controls and the gimbal controls. Those skilled in the art may display the aerial vehicle trajectory selection controls and the gimbal controls according to specific application scenarios or configuration requirements. In some embodiments, the aerial vehicle trajectory selection controls and the gimbal controls may be displayed simultaneously through one display interface. At this time, the aerial vehicle trajectory selection controls and the gimbal controls may be displayed at different positions of the display interface. For example, the aerial vehicle trajectory selection controls may be displayed on the left side of the display interface, and the gimbal controls may be displayed on the right side of the display interface, etc.

In some other embodiments, different display interfaces may be used to display the aerial vehicle trajectory selection controls and the gimbal controls respectively. At this time, displaying the aerial vehicle trajectory selection control and the gimbal control may include: displaying the aerial vehicle trajectory selection controls; after obtaining the user's operation on any aerial vehicle trajectory selection controls, displaying the gimbal controls to obtain the user's operation on the gimbal controls.

Figure 15:
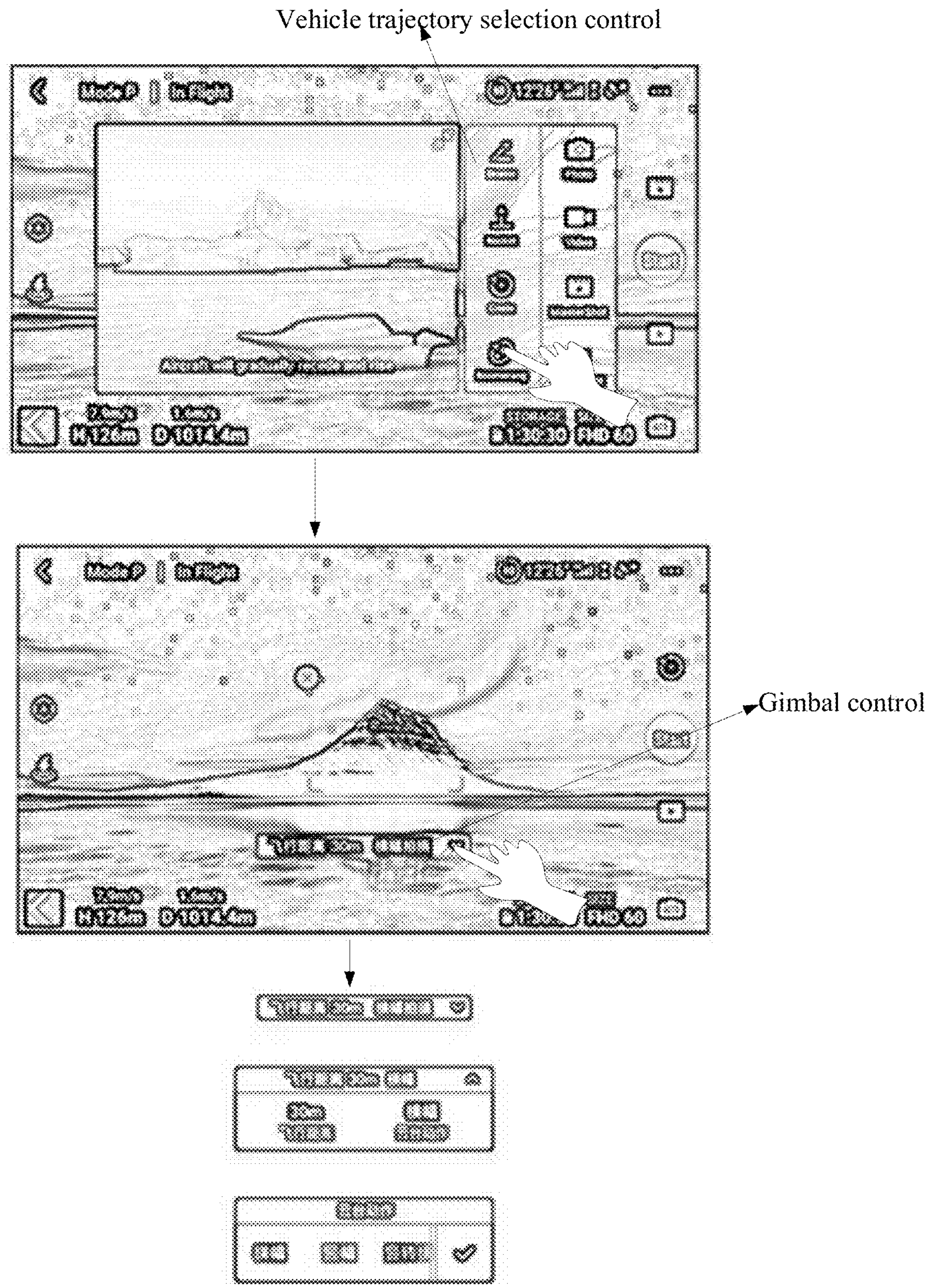
FIG. 15 is a schematic diagram showing displaying trajectory selection controls and gimbal controls of an aerial vehicle, consistent with the present disclosure.

For example, as shown in FIG. 15, the aerial vehicle trajectory selection controls may be first displayed in the display interface. The aerial vehicle trajectory selection controls may include: a soaring flight trajectory selection control, a tilted flight trajectory selection control, a circular flight trajectory selection control, a spiral flight trajectory selection control, etc. And then the user may input a selection or click operation for any of the displayed aerial vehicle trajectory selection controls, that is, the user may select any of the aerial vehicle trajectory selection controls and determine that the preliminary-flight trajectory used to control the aerial vehicle is the flight trajectory corresponding to the above-selected aerial vehicle trajectory selection control.

After obtaining the user's operation on any aerial vehicle trajectory selection control, the gimbal controls may be displayed in the display interface. For example, the gimbal control such as a "Horizontal photographing" adjustment control may be displayed in the middle or lower part of the display interface, and then the user may input an operation for the displayed gimbal controls to determine the gimbal control information used to control the gimbal and the image acquisition device. For example, the user may click the "Horizontal photographing" adjustment control displayed in the display interface, and then a plurality of sub-controls for controlling the gimbal may be displayed. The sub-controls may include a gimbal action control, and a horizontal control, a vertical control, a vertical-to-horizontal control, a horizontal-to-vertical control, etc., located under the gimbal action control. The above-mentioned different "Horizontal photographing" controls and the multiple sub-controls may all be used as gimbal controls. The gimbal control information used to control the gimbal and the image acquisition device may be obtained by the user's operation on the gimbal controls. The gimbal control information may include: yaw axis control parameters, pitch axis control parameters, roll axis control parameters, gimbal action parameters, etc. The gimbal action parameters may include horizontal photographing parameters, vertical photographing parameters, vertical-to-horizontal photographing parameters, horizontal-to-vertical photographing parameters, etc.

In some other embodiments, when using different display interfaces to display the aerial vehicle trajectory selection controls and the gimbal controls, displaying the aerial vehicle trajectory selection controls and the gimbal controls may also include: displaying the gimbal controls. After the gimbal control information for controlling the gimbal and the image acquisition device is obtained through the gimbal controls, the aerial vehicle trajectory selection controls may be displayed to obtain the user's operation on the aerial vehicle trajectory selection controls and obtain the preliminary-flight trajectory for controlling the aerial vehicle.

At S1402, the preliminary-flight trajectory of the aerial vehicle is generated based on the user's operation on the aerial vehicle trajectory selection control, and the preliminary-flight trajectory is used to control the aerial vehicle.

After the aerial vehicle trajectory selection control is displayed, the user may perform an operation, such as click operation, sliding operation, etc., on the aerial vehicle trajectory selection control through the display interface. After obtaining the operation input by the user on the aerial vehicle trajectory selection controls, the preliminary-flight trajectory of the aerial vehicle may be generated based on the above operation, and the preliminary-flight trajectory may be used to control the aerial vehicle. When the user inputs operations for different aerial vehicle trajectory selection controls, preliminary-flight trajectories corresponding to different aerial vehicle trajectory selection controls may be generated. For example, when the user inputs a click or selection operation for the soaring flight trajectory selection control, it may be determined that the preliminary-flight trajectory used to control the aerial vehicle is a soaring flight trajectory.

In some embodiments, to meet the different control needs of different users, after the preliminary-flight trajectory is generated, the user may set the relevant parameters of the preliminary-flight trajectory according to the design requirements or scene requirements. For example, the user may adjust or configure the parameters such as the distance of the preliminary-flight trajectory, the height of the preliminary-flight trajectory, or the speed corresponding to the preliminary-flight trajectory, and then the aerial vehicle may be controlled to move based on the configured preliminary-flight trajectory and other related parameters, to meet the different application requirements of different users.

At S1403, the gimbal control information is generated based on the user's operation on the gimbal control, and the gimbal control information is used to control the gimbal and the image acquisition device to perform a photographing operation on the target object.

After the gimbal controls are displayed, the user may operate the gimbal controls through the display interface, by, for example, click operation, sliding operation, etc. After obtaining the operation input by the user on the gimbal controls, the gimbal control information may be generated based on the above operation, and the gimbal control information may be used to control the gimbal and the image acquisition device to perform the photographing operation on the target object. When the user inputs operations for different gimbal controls, preliminary-flight trajectories corresponding to different gimbal controls may be generated. For example, when the user inputs a click or selection operation for the soaring flight trajectory selection control, it may be determined that the preliminary-flight trajectory used to control the aerial vehicle is the soaring flight trajectory.

In addition, this embodiment does not limit the specific implementation method of generating the gimbal control information based on the user's operation of the gimbal controls. In some embodiments, the gimbal may correspond to different photographing modes, and different gimbal control information may be generated under different photographing modes. Therefore, generating the gimbal control information based on the user's operation of the gimbal controls may include: based on the user's operation on the gimbal controls, displaying all photographing modes that the gimbal is able to realize; determining the photographing mode of the gimbal in response to the user's operation; and determining the gimbal control information according to the photographing mode of the gimbal.

For the gimbal, the photographing modes that the gimbal can realize may be pre-configured, and the photographing modes may include at least any one of: horizontal photographing, vertical photographing, horizontal-vertical switching photographing, or preset angle photographing. The horizontal photographing may be used to realize that the image acquisition device on the gimbal performs a horizontal photographing operation through the control operation of the gimbal. The vertical photographing may be used to realize that the image acquisition device on the gimbal performs a vertical photographing operation through the control operation of the gimbal. The horizontal-vertical switching photographing may be used to realize that the image acquisition device on the gimbal performs a horizontal photographing operation at a first moment and a vertical photographing operation at a second moment through the control operation of the gimbal, where the first moment is different from the second moment. The preset angle photographing may be used to realize that the image acquisition device on the gimbal performs a photographing operation at a preset angle through the control operation of the gimbal. The user may select the photographing mode of the gimbal according to the photographing needs, and the photographing mode may include the attitude of the gimbal when photographing.

Since the photographing mode of the gimbal is related to the gimbal control information of the gimbal, to accurately determine the gimbal control information, after displaying the gimbal controls, the user may operate the gimbal controls, and then, based on the user's operation on the gimbal controls, all photographing modes that the gimbal can achieve may be displayed. The photographing modes may include horizontal photographing, vertical photographing, horizontal-vertical switching photographing, preset angle photographing, etc. Then the user may perform a selection or sliding operation on any photographing mode, such that the photographing mode of the gimbal is determined in response to the user's operation. Subsequently, the gimbal control information may be determined according to the photographing mode of the gimbal. For example, in one embodiment, the method for determining the gimbal control information may be similar to the specific implementation method and implementation effect of S302 in the above embodiment. For details, reference can be made to the above description, which will not be repeated here.

In some other embodiments, since the photographing mode of the gimbal is related to the gimbal control information of the gimbal and the photographing mode of the gimbal may be determined based on the preliminary-flight trajectory of the aerial vehicle, generating the gimbal control information based on the user's operation on the gimbal controls may include: displaying the photographing modes that match the preliminary-flight trajectory of the aerial vehicle based on the user's operation on the gimbal controls; determining the photographing mode of the gimbal in response to the user's operation; and determining the gimbal control information based on the photographing mode of the gimbal.

Since the photographing mode of the gimbal is related to the gimbal control information of the gimbal, to accurately determine the gimbal control information, after displaying the gimbal controls, the user may operate the gimbal controls, and then, based on the user's operation on the gimbal controls, the photographing modes matching the preliminary-flight trajectory of the aerial vehicle may be displayed, where the preliminary-flight trajectories of the aerial vehicle may be different in different application scenarios and different preliminary-flight trajectories may correspond to the same or different photographing modes. In some embodiments, the distances between adjacent trajectory points in the preliminary-flight trajectory and the target object may be different, and the matching photographing modes may include horizontal-vertical switching photographing. For example, the distances between adjacent trajectory points in the preliminary-flight trajectory and the target object may gradually increase, and the matching photographing mode may include the vertical-to-horizontal photographing mode. For another example, the distances between adjacent trajectory points in the preliminary-flight trajectory and the target object may gradually decrease, and the matching photographing mode may include the horizontal-to-vertical photographing mode.

After determining the photographing mode of the gimbal, the gimbal control information may be determined according to the photographing mode of the gimbal. For example, in one embodiment, the method for determining the gimbal control information may be similar to the specific implementation method and implementation effect of S302 in the above embodiment. For details, reference can be made to the above description, which will not be repeated here.

In some other embodiments, since the photographing mode of the gimbal is related to the gimbal control information of the gimbal and the photographing mode of the gimbal may be determined based on the target object, generating the gimbal control information based on the user's operation on the gimbal controls may include: displaying the photographing modes that match the target object based on the user's operation on the gimbal controls; determining the photographing mode of the gimbal in response to the user's operation; and determining the gimbal control information based on the photographing mode of the gimbal.

Since the photographing mode of the gimbal is related to the gimbal control information of the gimbal, to accurately determine the gimbal control information, after displaying the gimbal controls, the user may operate the gimbal controls, and then, based on the user's operation on the gimbal controls, the photographing modes matching the target object may be displayed. The photographing mode may match the object category or size feature corresponding to the target object. When the photographing mode matches the object category of the target object, the object category of the target object may be identified first, such as plants, animals, buildings, people, etc., and then the matching photographing mode may be determined based on the object category of the target object. When the photographing mode matches the size feature of the target object, displaying the photographing modes matching the target object may include: obtaining the length and width of the target object on the screen; based on the length and width of the target object on the screen, displaying the photographing modes matching the target object recommended to the user.

For example, when the photographing mode of the gimbal is related to the size feature of the target object, to accurately determine the photographing mode of the gimbal, the length and width of the target object on the screen may be obtained, where the length and width of the target object on the screen may include the length and width of the outline of the identified target object on the screen, or the length and width of the selection identification box of the target object selected by the user. After obtaining the length and width of the target object on the screen, the photographing modes matching the target object recommended to the user may be displayed based on the length and width of the target object on the screen.

In some embodiments, based on the length and width of the target object on the screen, when displaying the photographing modes that are recommended to the user and match the target object, the matching photographing modes may include horizontal photographing when the aspect ratio of the target object is larger than a first threshold, the matching photographing modes may include vertical photographing when the aspect ratio of the target object is less than a second threshold, and the matching photographing modes may include horizontal-vertical switching photographing when the aspect ratio of the target object is greater than or equal to the second threshold and less than or equal to the first threshold.

In some other embodiments, based on the length and width of the target object on the screen, the photographing modes that are recommended to the user and match the target object may include: when the length of the target object is greater than the width, the matching photographing modes may include horizontal photographing, vertical photographing, and horizontal-vertical switching photographing; and, when the length of the target object is less than or equal to the width, the matching photographing modes may include vertical photographing.

In some other embodiments, the pan/tilt control information may be related to the photographing mode of the pan/tilt and the photographing duration that the user wants to perform the photographing operation on the target object. Therefore, determining the pan/tilt control information according to the photographing mode of the pan/tilt, may include: obtaining the preliminary-photographing duration;

and, according to the preliminary-photographing duration and the photographing mode of the pan/tilt, determining the pan/tilt control information.

To accurately determine the pan/tilt control information, the preliminary-photographing duration may be obtained first, and the preliminary-photographing duration may be determined based on the user's configuration operation, input operation or default operation. After obtaining the preliminary-photographing duration, the preliminary-photographing duration and the photographing mode of the pan/tilt may be analyzed and processed to determine the pan/tilt control information. In some embodiments, according to the preliminary-photographing duration and the photographing mode of the pan/tilt, determining the pan/tilt control information may include: when the photographing mode is horizontal-vertical switching photographing, determining durations corresponding to vertical photographing, horizontal-vertical switching photographing and horizontal photographing of the gimbal respectively, according to the preliminary-photographing duration; determining the pan/tilt control information based on the durations corresponding to vertical photographing, horizontal-vertical switching photographing and horizontal photographing of the gimbal respectively.

In one embodiment, determining the durations respectively corresponding to vertical photographing, horizontal-vertical switching photographing and horizontal photographing of the gimbal according to the preliminary-photographing duration may include: determining the first preset period in the preliminary-photographing duration as the time corresponding to the vertical photographing; determining the second preset period in the preset photographing duration information as the time corresponding to the vertical-horizontal switching photographing; and determining the third preset period in the preset photographing duration information as the time corresponding to the horizontal photographing. The first preset period, the second preset period and the third preset period may constitute the preset photographing duration.

In some instances, the gimbal control information may be related to the distance information of the preliminary-flight of the aerial vehicle in addition to the photographing mode and photographing duration information of the gimbal. In this case, determining the gimbal control information according to the photographing mode of the gimbal may include: displaying the distance information of the preliminary-flight of the aerial vehicle; and determining the gimbal control information based on the distance information and the photographing mode of the gimbal.

For example, the implementation method and implementation effect of determining the gimbal control information according to the preliminary-photographing duration and the photographing mode of the gimbal, and determining the gimbal control information based on the distance information and the photographing mode of the gimbal may be similar to the implementation method and implementation effect of determining the gimbal control information according to the preliminary-photographing duration and the photographing mode of the gimbal, and determining the gimbal control information based on the distance information and the photographing mode of the gimbal in the above embodiments. For details, reference can be made to the above description, which will not be repeated here.

In the present disclosure, by obtaining the preliminary-photographing duration and then determining the gimbal control information according to the preliminary-photographing duration and the photographing mode of the gimbal, or by determining the gimbal control information based on the distance information and the photographing mode of the gimbal, not only the accuracy and reliability of determining the gimbal control information may be guaranteed, but also the implementation method of determining the gimbal control information may be expanded. That is, the user may determine different preliminary-photographing durations or distance information according to the photographing requirements, and determine different gimbal control information based on different preliminary-photographing durations or distance information, to meet the photographing requirements of different users, and further improve the flexibility and reliability of the use of the method.

After determining the photographing mode of the gimbal, the gimbal control information may be determined according to the photographing mode of the gimbal. For example, in one embodiment, the method for determining the gimbal control information may be similar to the specific implementation method and implementation effect of S302 in the above embodiment. For details, reference can be made to the above description, which will not be repeated here.

At S1404, the preliminary-flight trajectory and gimbal control information is sent to the aerial vehicle to automatically control the aerial vehicle.

After obtaining the preliminary-flight trajectory and gimbal control information, to realize control of the aerial vehicle, the preliminary-flight trajectory and gimbal control information may be sent to the aerial vehicle, such that the aerial vehicle may be automatically controlled based on the received preliminary-flight trajectory and gimbal control information, thereby effectively achieving automatic photographing of the target object.

In the present disclosure, the control method of the aerial vehicle may include generating the preliminary-flight trajectory of the aerial vehicle based on the user's operation of the aerial vehicle trajectory selection controls and then generating the gimbal control information based on the user's operation of the gimbal controls, by displaying the aerial vehicle trajectory selection controls and the gimbal controls. The preliminary-flight trajectory and gimbal control information may be sent to the aerial vehicle, thereby realizing automatic control operation of the aerial vehicle. The flight of the aerial vehicle may be controlled based on the preliminary-flight trajectory, and the gimbal and image acquisition device on the aerial vehicle may be controlled based on the gimbal control information. This effectively realizes the automatic decoupling control operation of the aerial vehicle, gimbal and image acquisition device. When photographing operations are performed through the aerial vehicle, the degree of freedom of photographing may be higher, which may provide users with a more flexible and rich photographing experience, and is conducive to bringing more interesting and visually impactful film effects. This may greatly enrich the photographing effects that can be achieved by the aerial vehicle, improve the practicality of the method, and is conducive to market promotion and application.

Figure 16:
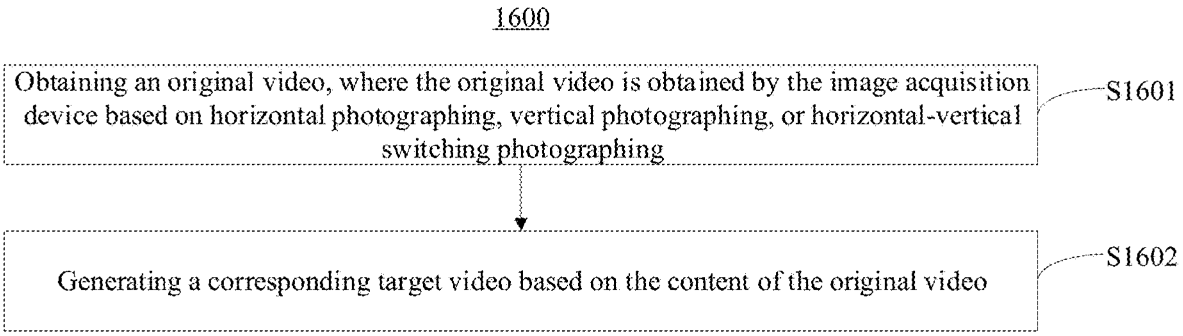
FIG. 16 is a flowchart of another control method of an aerial vehicle consistent with the present disclosure.

In another embodiment in FIG. 16, which is a flowchart of another control method 1600 of the aerial vehicle, the method may further include S1601 to S1602.

At S1601, the original video from the image acquisition device is obtained, where the original video is obtained by the image acquisition device based on horizontal photographing, vertical photographing, or horizontal-vertical switching photographing.

After obtaining the preliminary-flight trajectory and gimbal control information, and sending the preliminary-flight trajectory and gimbal control information to the aerial vehicle, the aerial vehicle may be automatically controlled based on the preliminary-flight trajectory and gimbal control information to realize the photographing operation of the target object, and the corresponding original video may be generated through the content photographed by the image acquisition device. Different working modes and gimbal control information may generate original videos with different effects. The original video may include: a horizontal photographing video, a vertical photographing video, a horizontal-to-vertical photographing video, a vertical-to-horizontal photographing video, etc., which may effectively meet the user's photographing needs and is conducive to improving the flexibility and reliability of the method.

At S1602. the corresponding target video is generated based on the content of the original video.

After the original video is obtained, the content in the original video may be analyzed and processed to generate the target video corresponding to the original video. For the original video, when the original video is a video photographed by the horizontal-to-vertical photographing or the vertical-to-horizontal photographing, since the video image amplitude in the original video needs to be switched, to ensure the quality and effect of displaying the original video, when the original video is played, the user may be reminded to rotate the display device used to play the original video. At this time, generating the corresponding target video based on the content of the original video may include: when the original video roughly switches between horizontal and vertical, adding the rotation prompt icon to generate the target video to prompt the user to rotate the display device when watching the target video.

In this embodiment, by acquiring the original video from the image acquisition device and then generating the corresponding target video based on the content of the original video, the user's need to photograph the target object may be met. In addition, when the photographed video is obtained based on horizontal photographing, vertical photographing, or horizontal-vertical switching photographing, the rotation prompt icon may be added to the photographed video through the control terminal to obtain the target video, thereby effectively ensuring the stability and reliability of the generation of the target video. In the process of playing the target video, the user may be reminded to adjust the display device in time based on the added rotation prompt icon to ensure that the target video displayed by the display device is always in the correct orientation, thereby further improving the quality and effect of displaying the target video.

Figure 17:
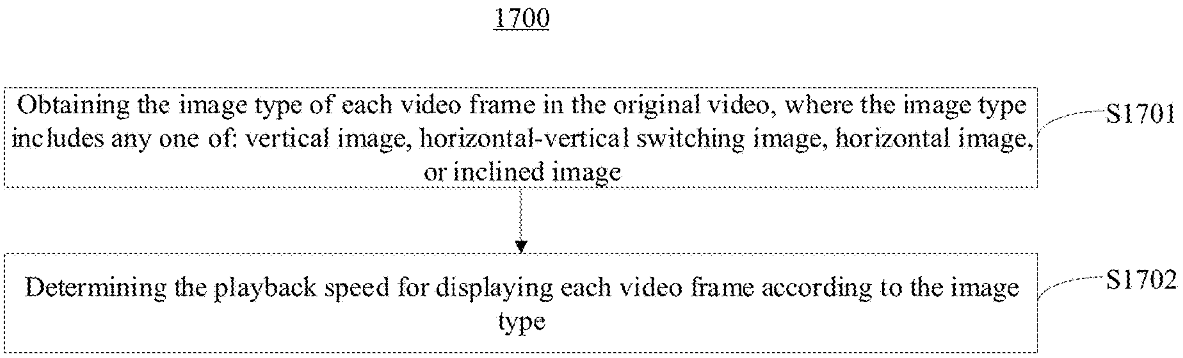
FIG. 17 is a flowchart of another control method of an aerial vehicle consistent with the present disclosure.

In another embodiment shown in FIG. 17, which is a flowchart of another control method 1700 of the aerial vehicle, in the process of controlling the aerial vehicle, the original video may be obtained through the image acquisition device. To further improve the practicality of the method, this embodiment provides an implementation method for configuring the playback speed of the original video. The method 1700 in this embodiment may further include:

S1701: obtaining the image type of each video frame in the original video, where the image type includes any one of: vertical image, horizontal-vertical switching image, horizontal image, or inclined image; and S1702: determining the playback speed for displaying each video frame according to the image type.

In one embodiment, according to the image type, determining the playback speed for displaying each video frame may include: when the image type of the video frame is one of the vertical image, the horizontal-vertical switching image, or the inclined image, determining that the playback speed for displaying the video frame is the first speed; when the image type of the video frame is the horizontal image, dividing all horizontal images into a front image set and a rear image set; determining that the playback speed of each video frame in the front image set is the second speed, and the playback speed of each video frame in the rear image set is the first speed, where the second speed is greater than the first speed.

The specific implementation methods and implementation effects of the above steps in this embodiment are similar to the specific implementation methods and implementation effects of S1001-S1002 in the above embodiments. For details, reference can be made to the above description, which will not be repeated here.

In this embodiment, by obtaining the image type of each video frame in the original video, and then determining the playback speed for displaying each video frame according to the image type, it may be effectively realized that after the original video is obtained, the playback speed of the original video is configured based on the video frames of different image types in the original video, such that the original video can be played based on the configured playback speed to meet different users' different playback requirements for the original video, further improving the flexibility and reliability of the use of the method.

Figure 18:
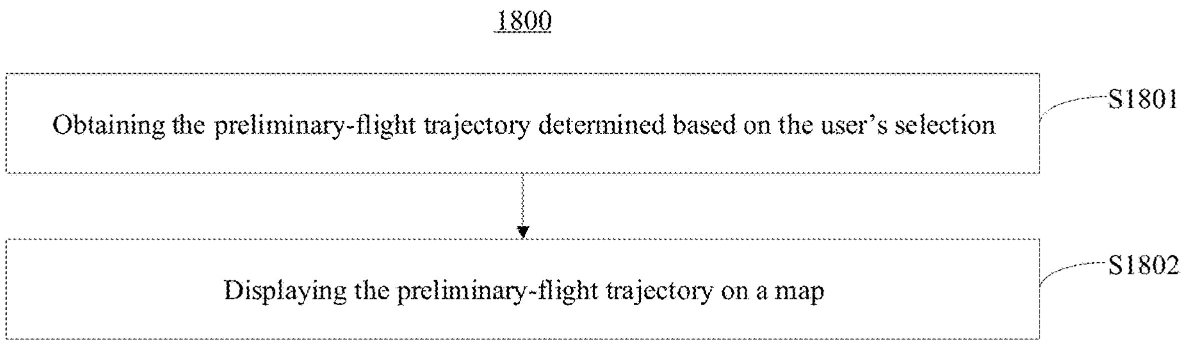
FIG. 18 is a flowchart of another control method of an aerial vehicle consistent with the present disclosure.

In another embodiment shown in FIG. 18, which is a flow chart of another control method 1800 of an aerial vehicle, on the basis of the above embodiments, in the process of controlling the aerial vehicle, to satisfy the user's timely understanding of the real-time operating status of controlling the aerial vehicle, the method 1800 may further include:

S1801: obtaining the preliminary-flight trajectory determined based on the user's selection; and S1802: displaying the preliminary-flight trajectory on a map.

Displaying the preliminary-flight trajectory on the map may include: obtaining the real-time position of the aerial vehicle; displaying the real-time position and preliminary-flight trajectory of the aerial vehicle on the map.

The specific implementation method and implementation effect of the above steps in this embodiment may be similar to the specific implementation method and implementation effect of S1101-S1102 in the above embodiment, and for the specific details, reference can be made to the above statement content, which will not be repeated here.

In this embodiment, by obtaining the preliminary-flight trajectory determined based on the user's selection and then displaying the preliminary-flight trajectory on the map, the user may intuitively view the real-time position and preliminary-flight trajectory of the aerial vehicle through the map, which further improves the practicality of the method.

Figure 19:
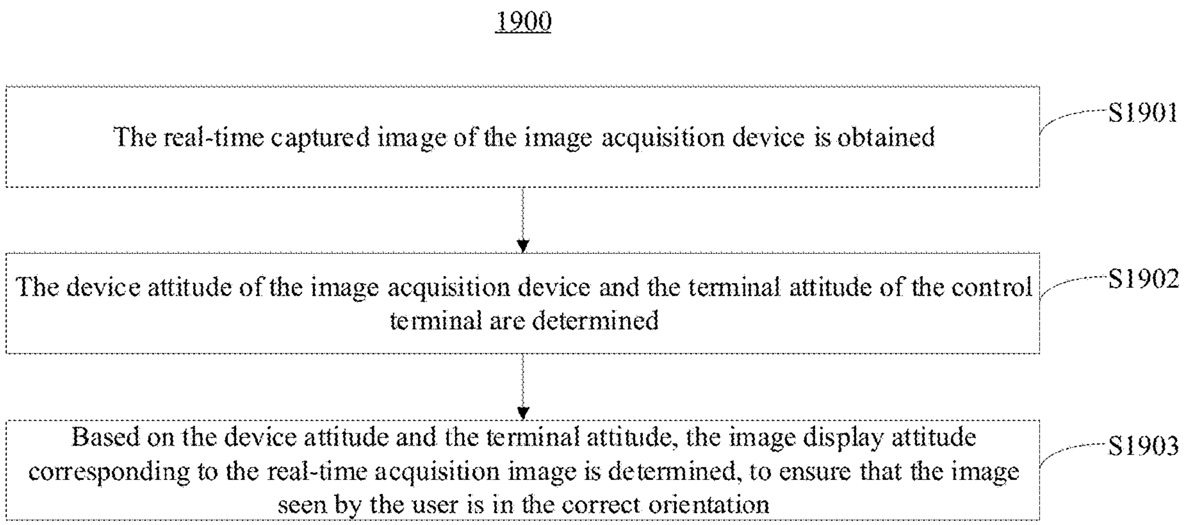
FIG. 19 is a flowchart of an image display method consistent with the present disclosure.

The present disclosure also provides an image display method. As shown in FIG. 19, which is a flowchart of an image display method 1900 provided by one embodiment of the present disclosure, the execution subject of the image display method may be a control device of the aerial vehicle. For example, the control device of the aerial vehicle may be implemented as a control terminal, that is, the control method may be applied to the control terminal, and the control terminal may be used to control the aerial vehicle. To realize the QuickShot function, the aerial vehicle may include a gimbal for carrying an image acquisition device, where the image acquisition device may be a camera, a video camera, a mobile phone with an image photographing function, a tablet computer or other devices, etc. The gimbal may include a three-axis gimbal, and the three-axis gimbal may include a first motor for driving the image acquisition device to rotate around a first axis (yaw axis), a second motor for driving the image acquisition device to rotate around a second axis (roll axis), and a third motor for driving the image acquisition device to rotate around a third axis (pitch axis). It can be understood that the type of the gimbal may be not only a three-axis gimbal, but also a four-axis gimbal. For gimbals of different structural types, the gimbal may also include different structural components. Those skilled in the art may set the specific structure of the gimbal according to the specific gimbal type, which will not be repeated here. The image display method 1900 may include S1901 to S1903.

At S1901, the real-time captured image of the image acquisition device is obtained.

In the process of the aerial vehicle flight operation, the image acquisition device on the aerial vehicle may be used to photograph the target object, such that the real-time captured image corresponding to the target object may be obtained. To enable the user to timely understand the photographing of the target object, the control terminal may obtain the real-time captured image of the image acquisition device. In one embodiment, the control terminal may actively or passively obtain the real-time captured image of the image acquisition device through the image acquisition device.

At S1902: the device attitude of the image acquisition device and the terminal attitude of the control terminal are determined.

In the process of photographing the target object, the device attitude of the image acquisition device may change. For example, at time t1, the device attitude of the image acquisition device may be a horizontal photographing attitude; and, at time t2, the device attitude of the image acquisition device may be a vertical photographing attitude. When the device attitude of the image acquisition device changes, the image attitude of the real-time captured image obtained by the image acquisition device may also change. To make the image attitude displayed on the control terminal consistent with the device attitude of the image acquisition device, after acquiring the real-time captured image of the image acquisition device, the device attitude of the image acquisition device and the terminal attitude of the control terminal may be determined.

The present disclosure does not limit the implementation method of determining the device attitude of the image acquisition device. Those skilled in the art may configure it according to specific application scenarios or application requirements. In some embodiments, determining the device attitude of the image acquisition device may include: obtaining the device attitude of the image acquisition device through an inertial measurement unit set on the image acquisition device. In some other embodiments, since the image acquisition device is located on the gimbal, the device attitude of the image acquisition device may be closely related to the gimbal attitude. Therefore, determining the device attitude of the image acquisition device may include: obtaining the attitude information of the gimbal platform, and determining the device attitude of the image acquisition device based on the attitude information of the gimbal platform, thereby effectively ensuring the accuracy and reliability of determining the device attitude of the image acquisition device.

The present disclosure does not limit the method for determining the terminal attitude of the control terminal. Those skilled in the art may configure it according to specific application scenarios or application requirements. In some embodiments, determining the terminal attitude of the control terminal may include: obtaining the terminal attitude of the control terminal through an inertial measurement unit or a sensing device (an angle sensor, etc.) set on the control terminal.

At S1903, based on the device attitude and the terminal attitude, the image display attitude corresponding to the real-time acquisition image is determined, to ensure that the image seen by the user is in the correct orientation.

After obtaining the device attitude and the terminal attitude, the device attitude and the terminal attitude may be analyzed and processed to determine the image display attitude corresponding to the real-time acquisition image to ensure that the image seen by the user is in the correct orientation. In some embodiments, based on the device attitude and the terminal attitude, determining the image display attitude corresponding to the real-time acquisition image may include: obtaining a machine learning model for determining the image display attitude, and inputting the device attitude and the terminal attitude into the machine learning model, such that the image display attitude corresponding to the real-time acquisition image is obtained to ensure that the image seen by the user is in the correct orientation.

In some other embodiments, based on the device attitude and the terminal attitude, determining the image display attitude corresponding to the real-time acquisition image may include: rotating and correcting the real-time acquisition image based on the device attitude to obtain the image display attitude, where the image display attitude is consistent with the terminal attitude.

After obtaining the device attitude and the terminal attitude, it may be possible to identify whether the device attitude is consistent with the terminal attitude. When the device attitude is consistent with the terminal attitude, it may mean that the real-time acquired image displayed on the control terminal at this time is in the correct orientation. Since the image seen by the user is in the correct orientation, there may be no need to make any adjustment to the real-time acquired image at this time. When the device attitude is inconsistent with the terminal attitude, since the real-time acquired image displayed on the control terminal at this time is not in the correct orientation, to enable the user to see the image in correct orientation through the control terminal, the real-time acquired image may be rotated and corrected based on the device attitude to obtain the image display attitude. The obtained image display attitude may be consistent with the terminal attitude, ensuring that the image seen by the user is in the correct orientation.

Figure 20:
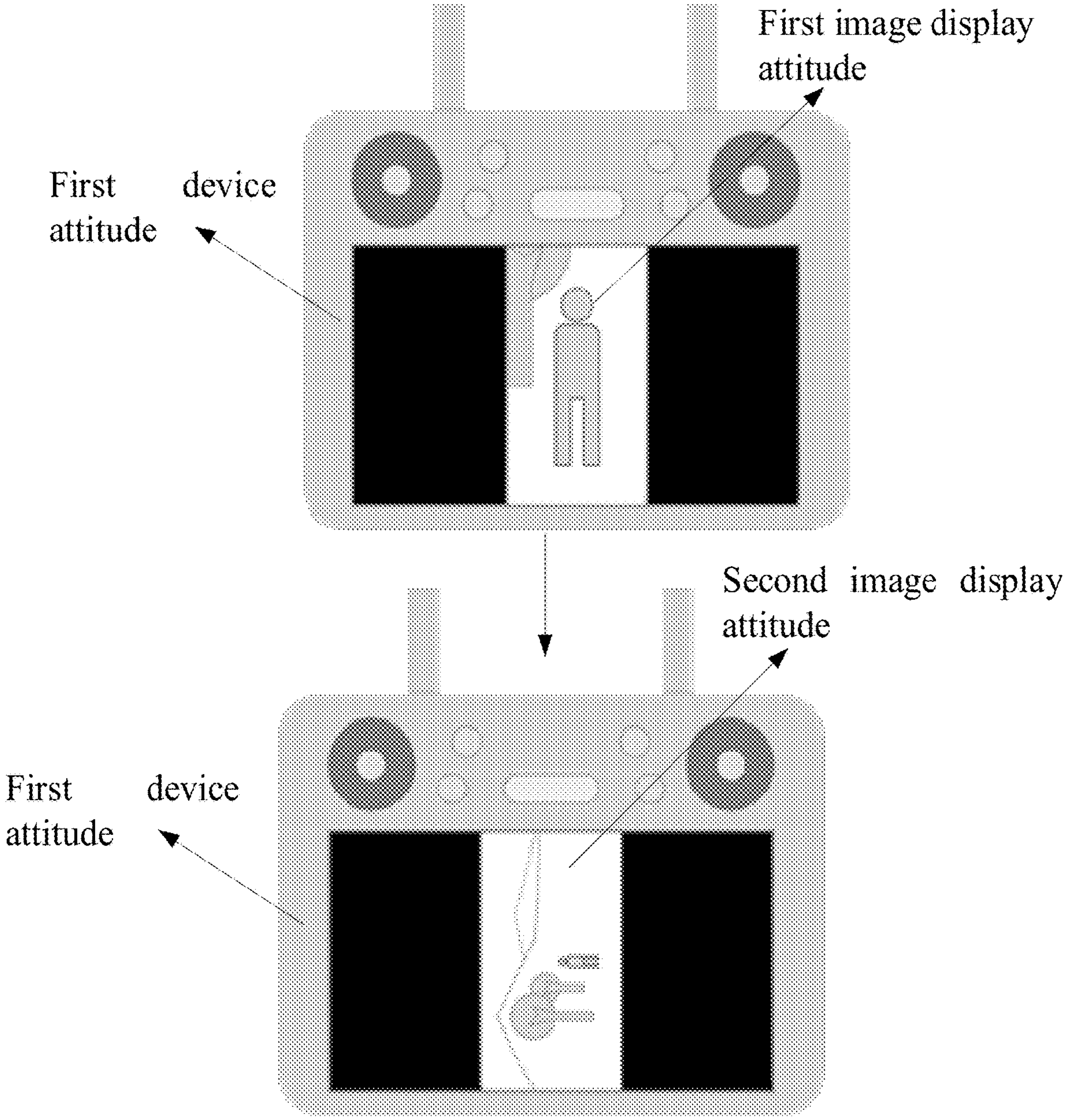
FIG. 20 is a schematic diagram showing a control terminal displaying a real-time photographed image, consistent with the present disclosure.

For example, in one embodiment, the control terminal may be a handheld remote controller. The handheld remote controller may be provided with a display module, and the real-time captured image captured by the image acquisition device may be displayed through the display module. When the gimbal is in the horizontal-vertical switching photographing mode, the image acquisition device may have a horizontal-vertical switching photographing process, which easily causes the image transmission screen to rotate with the rotation of the roll axis on the gimbal. As shown in FIG. 20, at the time t1, the device attitude of the handheld remote controller is the first device attitude. At this time, the handheld remote controller may obtain the real-time captured image obtained by the image acquisition device, and the real-time captured image may be the first image display attitude. At the time t2, the device attitude of the handheld remote controller may be the first device attitude. At this time, the handheld remote controller may obtain the real-time captured image obtained by the image acquisition device, and the real-time captured image may be the second image display attitude. The first image display attitude may be different from the second image display attitude, that is, in the horizontal-vertical switching photographing process of the image acquisition device, at a certain stage, the real-time captured image may not match the observation angle in the state of holding the handheld remote controller normally.

Figure 21:
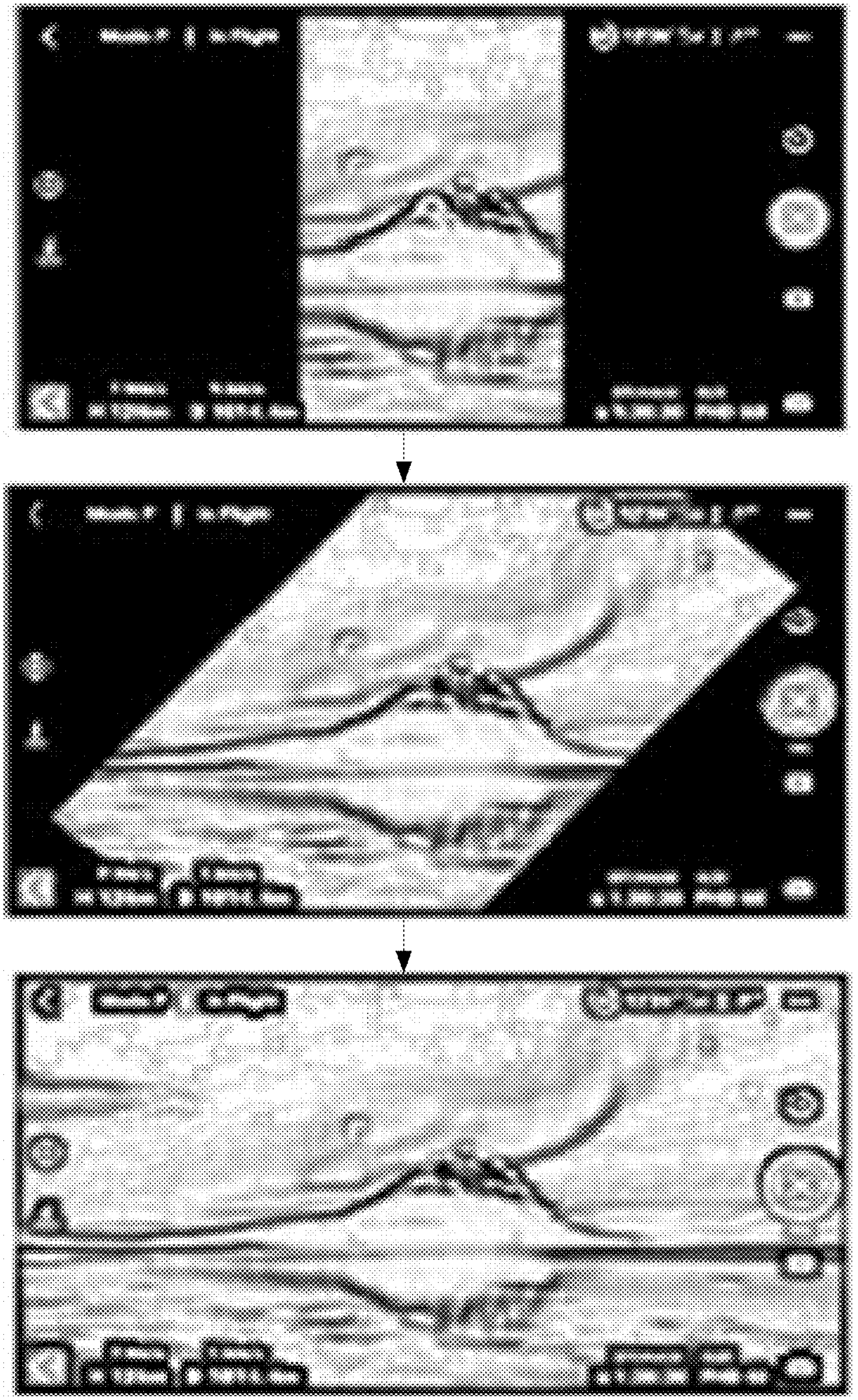
FIG. 21 is a schematic diagram showing displaying a real-time photographed image, consistent with the present disclosure.

To solve the above technical problems, the present embodiment provides a new form of image transmission interaction. As shown in FIG. 21, when rotary photographing is performed on a certain mountain using the image acquisition device, a real-time image of the mountain may be obtained. At the time t1, a vertical image may be obtained, and then the vertical image may be synchronously displayed using the display module in the handheld remote controller. At the time t2-t3, when the image acquisition device is rotated and photographs, the display module in the handheld remote controller may synchronously rotate the obtained real-time image, thereby achieving synchronous alignment of the gimbal angle and the image display attitude of the real-time image to ensure that the content of the real-time image is always at the correct viewing angle.

The image display method provided in the present embodiment may obtain the real-time captured image of the image acquisition device, determine the device attitude of the image acquisition device and the terminal attitude of the control terminal, and then determine the image display attitude corresponding to the real-time captured image based on the device attitude and the terminal attitude, to ensure that the image seen by the user is in the correct orientation. The problem of skewed image transmission screen when photographing with gimbal action may be alleviated, thereby ensuring the observability of the image transmission screen during the entire photographing process, and more intuitively displaying the effect of the final film viewing in the photographing stage, and simulating the change effect of the aerial vehicle lens. The users may have a better image transmission observation experience when photographing such camera movements, further improving the practicality of the image display method, and is conducive to market promotion and application.

Figure 22:
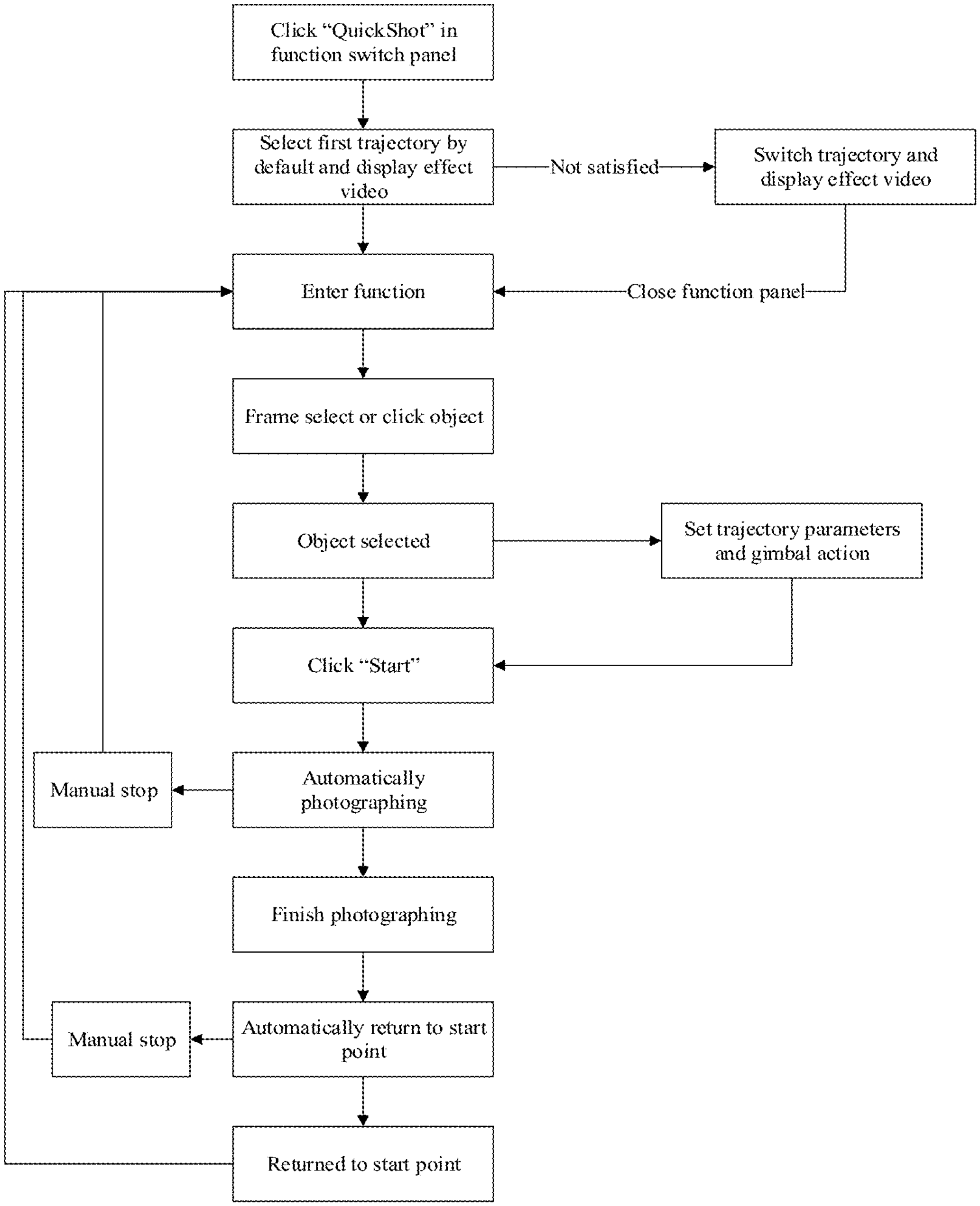
FIG. 22 is a flowchart of another control method of an aerial vehicle consistent with the present disclosure.

The present disclosure provides a control method of an aerial vehicle, which may realize automatic decoupling control operation of the aerial vehicle, a gimbal and an image acquisition device, such that the user is able to more flexibly define the preliminary-flight trajectory and gimbal action of the aerial vehicle to obtain a richer material photographing effect. Also, a QuickShot photographing mode suitable for viewing on a mobile terminal with obvious subject and environment display may be provided. The present disclosure may also realize target recognition, target position estimation, selection of flight trajectory and gimbal trajectory, image transmission interface display and other contents. As shown in FIG. 22, the implementation of the photographing combination of decoupling the flight trajectory and the gimbal action may include the following.

S1.1: Flight Trajectory Selection Operation.

A function selecting panel, which includes a one-key short film function for realizing the QuickShot function, may be displayed. After the user selects the QuickShot function in the function selection panel, the flight trajectory may be selected. After selecting the flight trajectory, the animation, video effect or text description of the flight trajectory may be displayed to assist the user in understanding the flight camera movement effect of the selected flight trajectory.

When the user does not select a flight trajectory in the function selection panel, the first flight trajectory may be selected by default in the function selecting panel, and a display effect video corresponding to the default flight estimate may be displayed in the function switching panel. When the user is not satisfied with the default selected flight trajectory, the trajectory switching operation may be performed in the function selection panel, and then the display effect video corresponding to the switched flight trajectory may be displayed in the function switching panel. When the user is satisfied with the default selected flight trajectory, the function selection panel may be folded and the next function display page may be displayed to realize the target object selection operation.

Further, for the flight trajectory, the user may adjust or configure the distance information and height information of the flight trajectory according to the needs. For example: when selecting the flight trajectory, the current position of the aerial vehicle may be determined first, and the starting point of the flight trajectory may be the current position of the aerial vehicle (the starting point of the aerial vehicle), and then the flight distance corresponding to the flight trajectory may be calculated based on the current position of the aerial vehicle and the target position.

S1.2: Select the Target.

Figure 23:
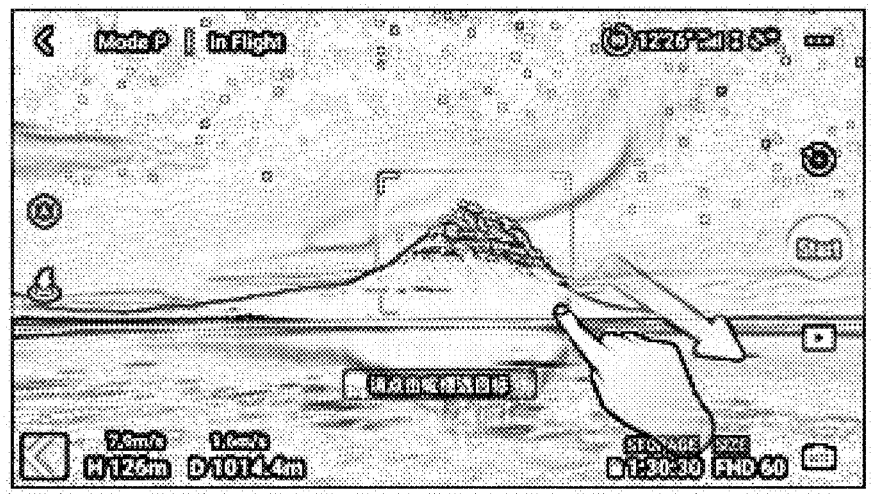
FIG. 23 is a schematic diagram showing selecting a target object, consistent with the present disclosure.
Figure 24:
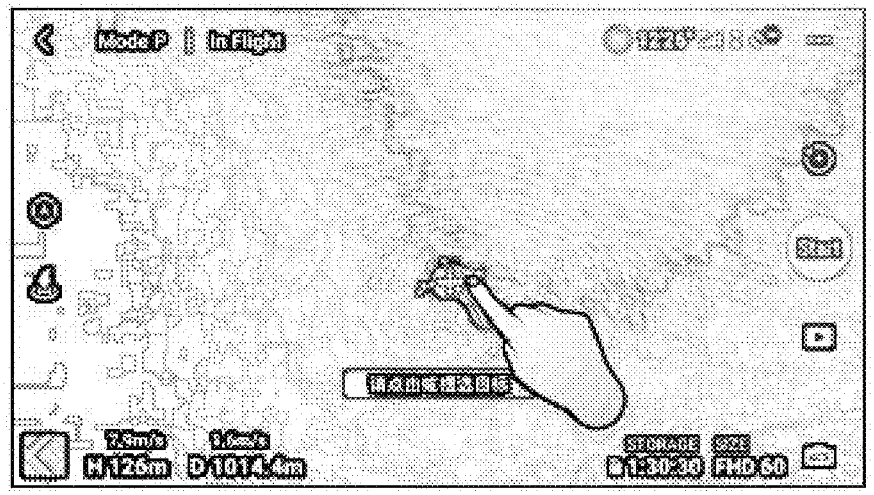
FIG. 24 is another schematic diagram showing selecting a target object, consistent with the present disclosure.

After selecting the flight trajectory for controlling the aerial vehicle, the function switching panel may be folded, and then the interface for selecting the target may be displayed and the user is guided by information to click or frame the target, as shown in FIG. 23 and FIG. 24. The user may draw a frame with his finger or click on the target mark to select the target. The selected target may be an open space, a forest, a person, a vehicle, a paddle, a sea, etc.

After the user selects the target, the interface for selecting the target may be closed automatically, or the user may manually close the interface for selecting the target. For example, the user may click on a blank area in the interface to fold the interface for selecting the target.

S1.3: Set the Flight Trajectory Parameters and Gimbal Control Parameters.

After selecting the target, the user may freely set the parameters for photographing the target. The parameters for photographing the target may include two options: the flight trajectory parameters and the gimbal control parameters. The flight trajectory parameters may refer to parameters related to the flight trajectory, such as: flight distance, flight altitude, circling direction, etc. The gimbal control parameters may refer to the direction and movement of the gimbal during photographing, such as: static horizontal photographing, static vertical photographing, horizontal-vertical photographing, or other static or dynamic rotations at any angle, such as: horizontal to vertical, counterclockwise 300 to clockwise 30°, etc.

Figure 25:
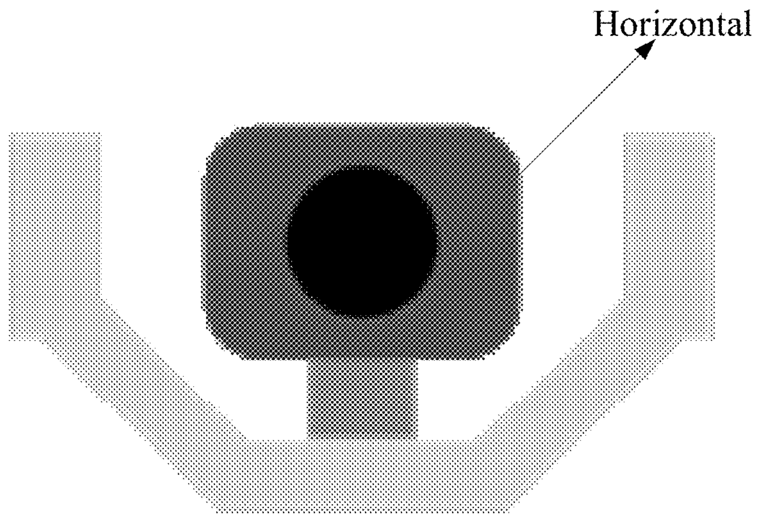
FIG. 25 is a schematic diagram showing horizontal photographing, consistent with the present disclosure.
Figure 26:
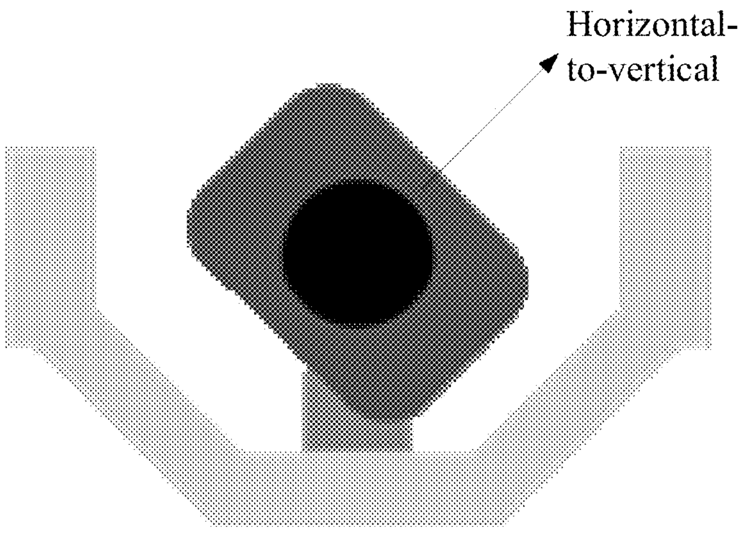
FIG. 26 is a schematic diagram showing horizontal-to-vertical photographing, consistent with the present disclosure.
Figure 27:
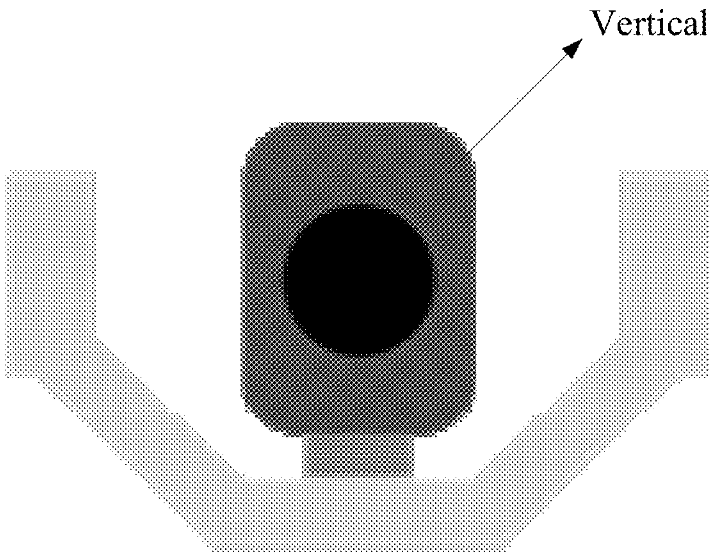
FIG. 27 is a schematic diagram showing vertical photographing, consistent with the present disclosure.

The movement of the gimbal represents the rotation of the camera gimbal in reality to place the camera module in horizontal, vertical, or horizontal-vertical switching dynamic camera movement. As shown in FIG. 25, the static horizontal photographing action may place the camera module horizontally. As shown in FIG. 26, the horizontal-vertical photographing action may place the camera in horizontal-vertical switching dynamic camera movement. As shown in FIG. 27, the static vertical photographing action may place the camera module vertically.

Further, when selecting the gimbal control parameters, the gimbal control parameters may be determined based on the type of flight trajectory. For example, for the gradually fading skyward flight trajectory or spiral flight trajectory, the gimbal control parameters may be determined as the horizontal-vertical switching camera movement parameters.

After completing the setting operation of the flight trajectory parameters and the gimbal control parameters, the user may freely match the flight trajectory and the gimbal control parameters, to derive different filming results with the number of flight trajectories×gimbal control parameters, which greatly enriches the filming style and effect. Especially for the newly added multiple gimbal actions (for example, vertical to horizontal gimbal actions, tilt gimbal actions, etc.), matching different flight trajectories may produce relatively novel filming effects. For example, when matching with the trajectory away from the target (gradually far away, skyward, spiral, etc.), the effect of photographing the video may be the best, which may achieve the extremely impactful visual effect of highlighting the main target in the vertical screen and showing the wide environment in the horizontal screen. Matching the trajectory surrounding the target (surrounding, spiral, comet, etc.) may also achieve an interactive and fresh content viewing experience, such that users have a certain sense of participation, further improving the flexibility and reliability of this method.

The selection method of the flight trajectory and gimbal action combination is not limited to the above-mentioned method including selecting the flight trajectory first and then selecting the gimbal action. In some other embodiments, the gimbal action may be selected first, and then the flight trajectory may be selected. In yet some other embodiments, combining and selecting the flight trajectory and gimbal action may be performed at the same time.

S1.4: Control the Aerial Vehicle to Perform Photographing Operations Based on the Configured Flight Trajectory, Flight Trajectory Parameters, and Gimbal Control Parameters.

A display interface for controlling the aerial vehicle may be displayed on the display interface of the control terminal, and a shutter button for starting photographing may be displayed on the display interface. The user may click the shutter button to start photographing. During photographing, the shutter progress bar may show the photographing progress, and the shutter button may support clicking to cancel photographing. When the gimbal action option is in the "vertical-horizontal" type, the image transmission display form of the photographing process may be different.

In the content photographed in QuickShot mode, usually, the two most important parts displayed by the user may be people (or the main object) and the environment, the vertical-to-horizontal photographing mode may be able to bring the greatest content value, and greatly highlight the contrast between people (or the main object) and the environment when viewed on the mobile terminal, which may further improve the practicality of this method.

In one embodiment, when the aerial vehicle is controlled to perform the photographing operation based on the flight trajectory, flight trajectory parameters and gimbal control parameters, if it is needed to realize the vertical-to-horizontal camera movement, there may be two main ways to realize the above-mentioned preset camera movement effect: (1) gradually rotating the gimbal roll axis in the early stage of photographing; (2) controlling the rotation and scaling of the cropping range in the later stage.

The implementation method in this application embodiment is mainly through the above-mentioned implementation method (1). By rotating the gimbal roll axis in the early stage of photographing, it may be ensured that the image is not cropped, that is, there may be no loss of image quality and a clearer film quality may be achieved. At this time, the entire photographing process may be divided into three stages: (a) vertical photographing stage; (b) rotation stage; (c) horizontal photographing stage.

In the vertical photographing stage (a), the gimbal may continue to photograph vertically for a period of time, and during this period of time, the details of the person (or the main object) may be highlighted. In this stage, the distance between the aerial vehicle and the person (or the main object) should be at a relatively close position.

In the rotation stage (b), the gimbal may gradually rotate from vertical photographing to horizontal photographing. This period of time may last for about 5 seconds. The above period may be for users to rotate the display device when watching. Since it is necessary to take into account both the aesthetics and efficiency of the video photographing, the above period may be controlled to be about 5 seconds. The distance between the aerial vehicle and the person (or the main object) should be in a state of gradually moving away.

In the horizontal photographing phase (c), the gimbal may continue to photograph horizontally for a period of time. During this period of time, the environmental information of the person (or the main object) may be highlighted. In this stage, the distance between the aerial vehicle and the person (or the main object) should be at a relatively far position. At the same time, when photographing the person, the person (or the main object) may be appropriately placed in the lower third of the image to highlight the background environmental information.

Figure 28:
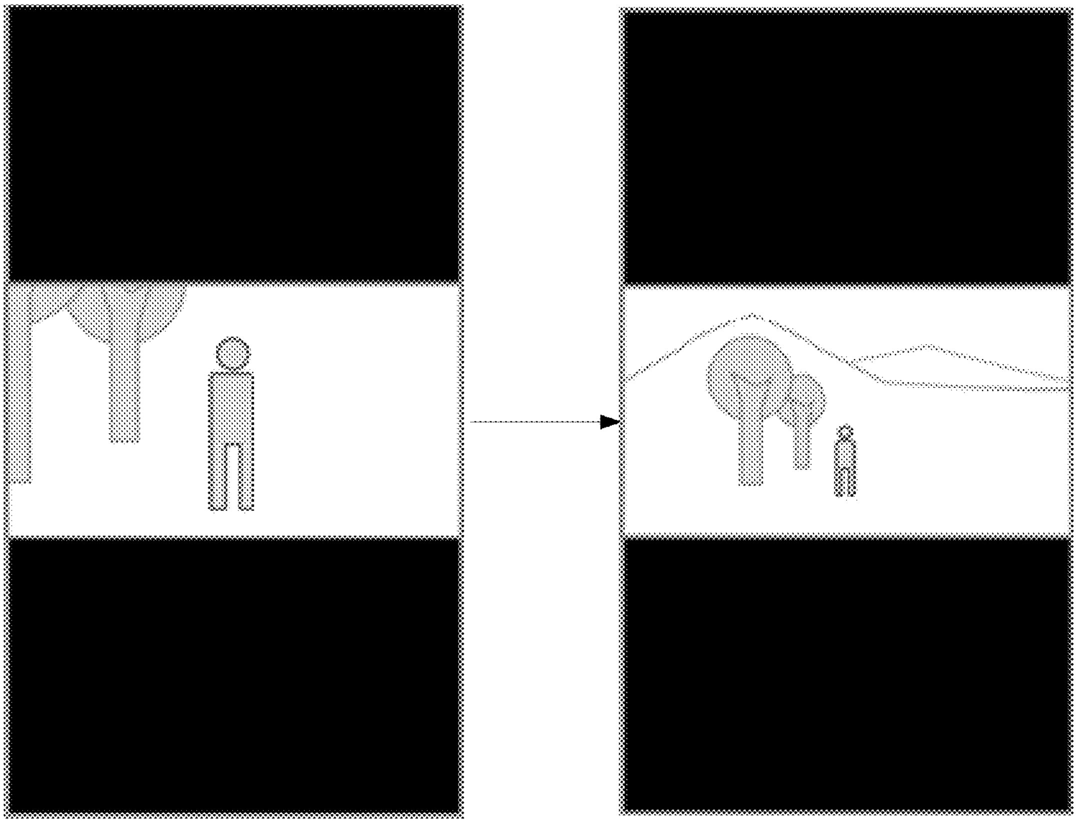
FIG. 28 is a schematic diagram showing displaying a captured video.
Figure 29:
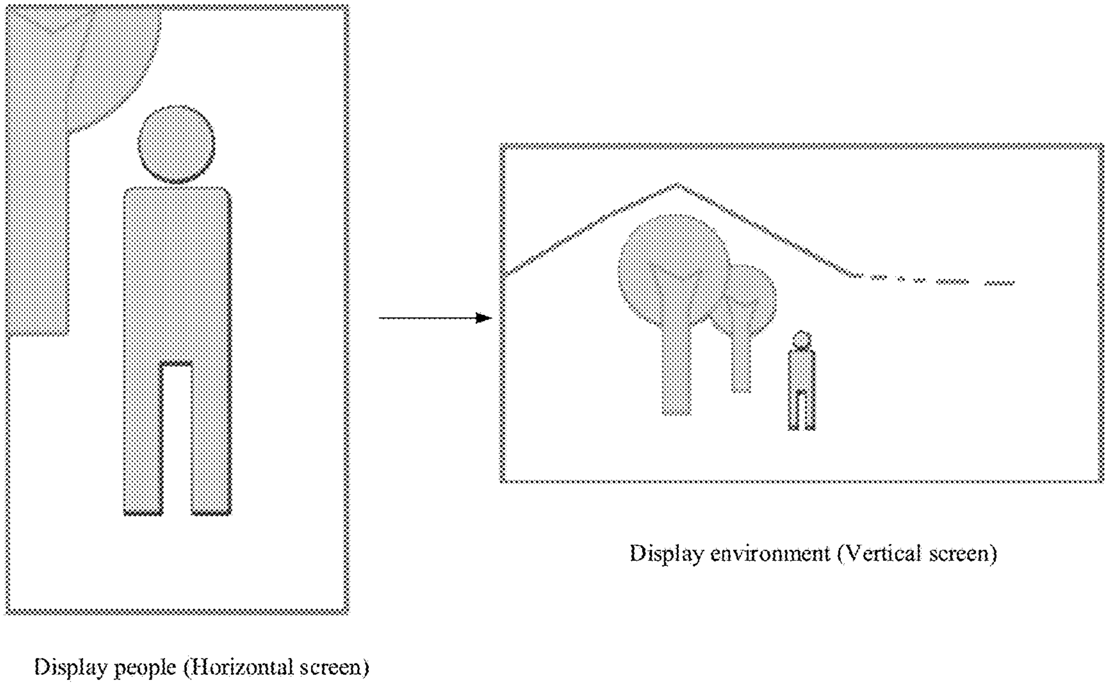
FIG. 29 is a flowchart of displaying a captured video consistent with the present disclosure.

Through the above-mentioned photographing operation, it may be achieved that the details of the person (or the main object) in the vertical screen may be displayed more clearly with a larger display area, and the environmental information in the horizontal screen may be displayed more comprehensively with a wider field of view. As shown in FIG. 28 and FIG. 29, the comparison of the experience of viewing the main object and the environmental part on the mobile terminal between the previous technologies and the present embodiment is respectively illustrated. Obviously, compared with the implementation method in the previous technologies, the implementation method in this embodiment may effectively maximize the use of the display area of the screen and enhance the user's immersion in watching the photographed video.

S1.5: Photographing is Completed and the Photographed Video is Obtained.

After the photographing operation is completed, the aerial vehicle may be controlled to automatically return to the starting point of photographing, and a "returning" prompt may be displayed during the process. At the same time, the user may also manually interrupt the return process and end the task. Further, the photographed video may be obtained through the image acquisition device on the aerial vehicle, and the photographed video may be cached in the aerial vehicle or the local end, such that the user is able to view the photographed video stored in the local end through the video display device.

The "vertical to horizontal" type of photographing movement or the "horizontal to vertical" type of photographing movement may be able to realize the video content effect of starting with the target details of the subject on the vertical screen and ending with the wide environment on the horizontal screen when browsing the photographing video on the mobile end. This type of photographing movement may be mainly used for the trajectory type that is close to the target at the start and far from the target at the end, such as: a gradually distant flight trajectory, a surrounding flight trajectory, etc.

Figure 30:
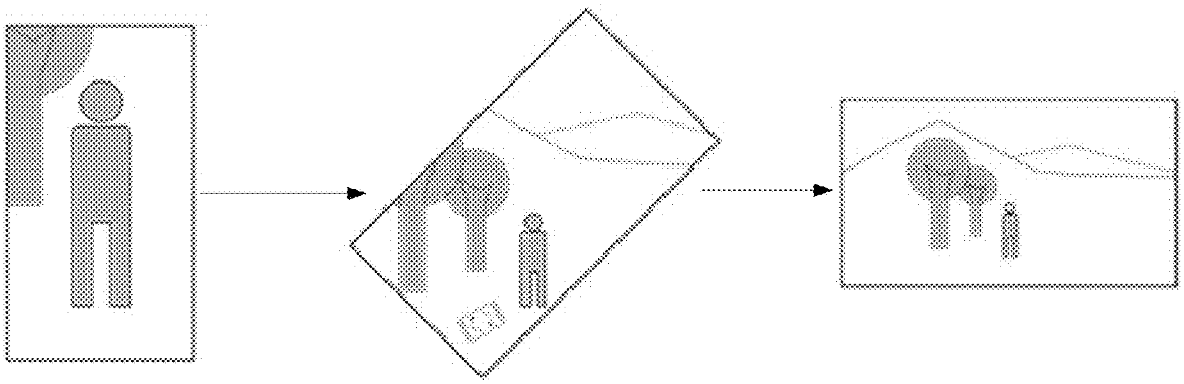
FIG. 30 is a schematic diagram showing displaying a captured video consistent with the present disclosure.
Figure 31:
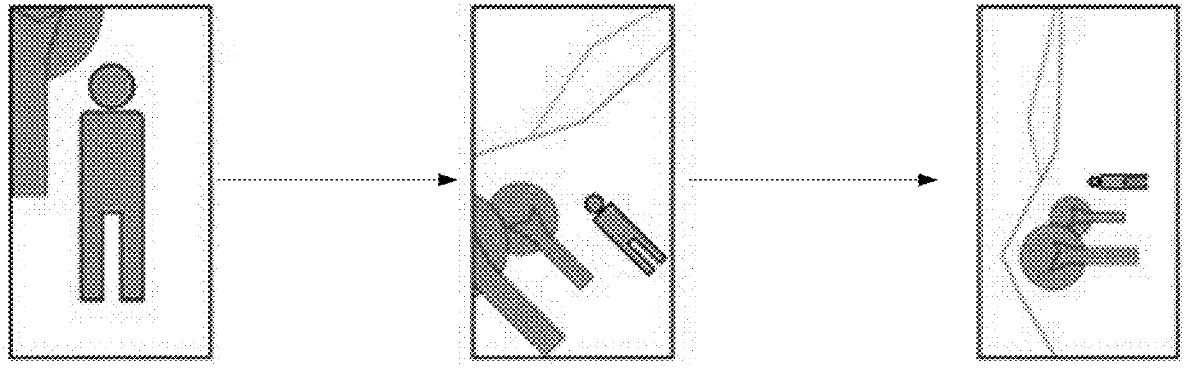
FIG. 31 is another schematic diagram showing displaying a captured video consistent with the present disclosure.

Further, after the captured video is acquired, the captured video may be displayed. In this case, the present disclosure provides a method for displaying the captured video. As shown in FIG. 30 and FIG. 31, the captured video may be played and displayed using a display device, and the method may include the following process.

When the captured video is played and displayed using a display device, the screen may first be displayed from a vertical image (satisfying the state of browsing social media or naturally holding the screen). At this time, the displayed screen may fill the screen, and the person or the main object may occupy a large proportion of the screen, which may clearly show the details of the person or main object.

As the captured video content is played, at a certain moment, an animation prompt may appear in the screen. The animation prompt may be used to prompt the user to rotate the display device (optional). The screen content in the captured video may also start to rotate at this time. The user may follow the guidance to gradually rotate the device (which may be clockwise or counterclockwise) to keep the content in the correct direction for the viewer.

As the captured video screen gradually moves away (optional, but the effect is best with the gradually moving away flight trajectory), more environmental details may be displayed in the video screen. Finally, the user may rotate the display device to a horizontal direction, and the video screen may also show all the details of the environment, showing the environment where the person or the main object is located through a wider field of view, and ending the entire content. It is understandable that the combination of the gimbal's camera movements and flight trajectories may be arbitrary, and is not limited to the start point being close to the person (or the main object) and the end point being far away from the person (or the main object).

In the above implementation, by always keeping the video content filling the screen when playing on the mobile terminal, the screen display area may be effectively maximized and the immersive viewing experience may be improved. At the same time, because the user needs to have a certain degree of interaction (rotating the screen direction) during the viewing process, the user's participation in the viewing may also be improved to a certain extent, bringing an interactive and novel viewing experience.

Figure 32:
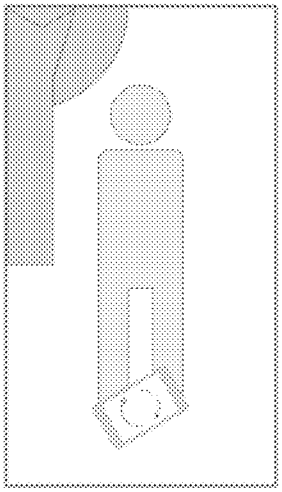
FIG. 32 is a schematic diagram showing rotation prompt information consistent with the present disclosure.
Figure 33:
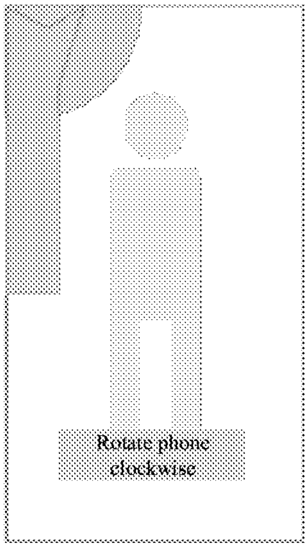
FIG. 33 is another schematic diagram showing rotation prompt information consistent with the present disclosure.

In addition, after acquiring the captured video obtained by the image acquisition device on the aerial vehicle, in one embodiment, the captured video may be post-processed, which may include conventional music addition of QuickShot, filters, or end LOGO processing, as well as adding rotation device prompt and video playback speed control, to realize the best viewing experience. For example, when adding prompt information to the captured video, the prompt information may be usually a type of picture or animation sticker suspended above the content, or may be in text form, as shown in FIG. 32 and FIG. 33. When adding the rotation prompt information, the prompt may appear about 2 seconds before the rotation stage appears, such that the user may be informed in advance that the content will rotate next and needs to be mentally prepared. After the rotation stage ends, the added rotation prompt information may disappear automatically.

Further, to enable the video to meet the photographing effect requirements of different users, the playback speed of the video may also be adjusted or configured. In some embodiments, the control of the playback speed of the video usually follows but is not limited to the following principles. The vertical photographing stage and the rotation stage may be played at 1× speed. The horizontal photographing stage may be divided into two sections: the acceleration section and the normal speed section. The acceleration section may be played at an accelerated speed, which is determined by the total duration, usually 2× to 4× speed, and the normal speed section may be 1× speed.

Under the above speed principle, the effect presented in the finished video may include that: first show the person (or the main object) at a relatively close position at a normal speed, and then show the gradual rotation process at a relatively gentle speed, during which the camera is pulled away. After the rotation is completed, the speed of the aerial vehicle pulling away may suddenly accelerate and resume normal speed at a relatively far position, creating a visual impact, and finally end at a normal speed at a relatively far position, creating a sense of ending. Overall, the beginning, development, transition and ending of a video will be well expressed.

The post-processing of the captured video is not limited to that described above, and should include support for any combination of accelerated and decelerated playback, rotating device prompts (or no prompts), or support for changing the soundtrack, filters, sticker packaging, endings, and prompts of the film by switching templates.

The technical solution provided by the present disclosure may greatly expand the diversity of photographing results by adopting a combination of flight trajectory and gimbal action decoupling, such that the QuickShot function is able to provide the users with richer creative possibilities. In addition, a new "vertical to horizontal" type of camera movement mode is proposed, which may bring a new form to the video content photographing watched on mobile terminals, and increase the richness and viewing of the film. Also, through the provided image transmission interaction solution, the problem of skewed image transmission images when photographing camera movements with gimbal movements may be effectively solved, allowing users to have a better image transmission observation experience when photographing such camera movements, further improving the practicality of the method, and facilitating market promotion and application.

Figure 34:
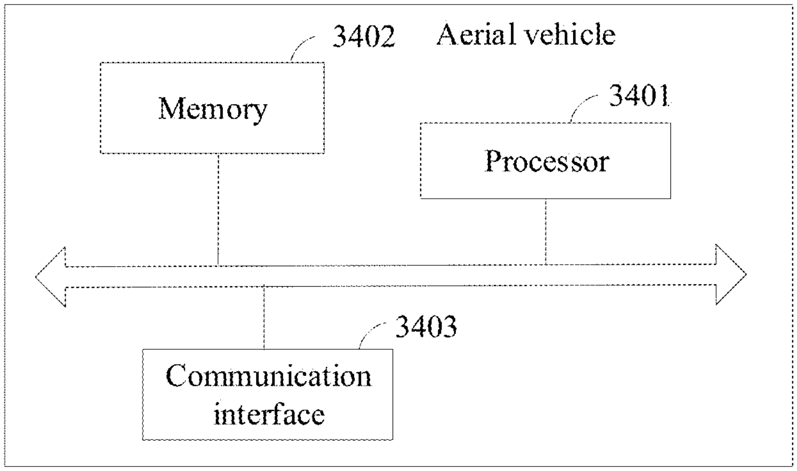
FIG. 34 is a schematic structural diagram of an aerial vehicle consistent with the present disclosure.

The present disclosure also provides an aerial vehicle. As shown in FIG. 34, which is a schematic structural diagram of an aerial vehicle consistent with the present disclosure, the aerial vehicle may be connected to a control terminal in communication, and the aerial vehicle may include a gimbal for carrying an image acquisition device. The aerial vehicle may execute the control method of the aerial vehicle provided by various embodiments of the present disclosure, such as that shown in FIG. 2. The aerial vehicle includes:

- at least one memory 3402 for storing at least one computer program; and
- at least one processor 3401 for running the at least one computer program stored in the at least one memory 3402 to realize: obtaining the target object to be photographed and the preset working mode, where the working mode includes the preliminary-flight trajectory and gimbal control information of the aerial vehicle, the preliminary-flight trajectory is set by the user, and the gimbal control information is also set by the user; automatically controlling the aerial vehicle to move according to the preliminary-flight trajectory; and automatically controlling the gimbal and the image acquisition device to photograph the target object according to the gimbal control information.

In one embodiment, the aerial vehicle also includes a communication interface 3403 for the aerial vehicle to communicate with other devices or a communication network.

The aerial vehicle shown in FIG. 34 may also implement the implementation methods and implementation effects of the methods of the embodiments shown in FIG. 1 to FIG. 13 and FIG. 22 to FIG. 33. For the part not described in detail in this embodiment, reference may be made to the relevant description of the embodiments shown in FIG. 1-FIG. 13 and FIG. 22-FIG. 33. The execution process and technical effects of the technical solution are described in the embodiments shown in FIG. 1-FIG. 13 and FIG. 22-FIG. 33, and will not be repeated here.

Figure 35:
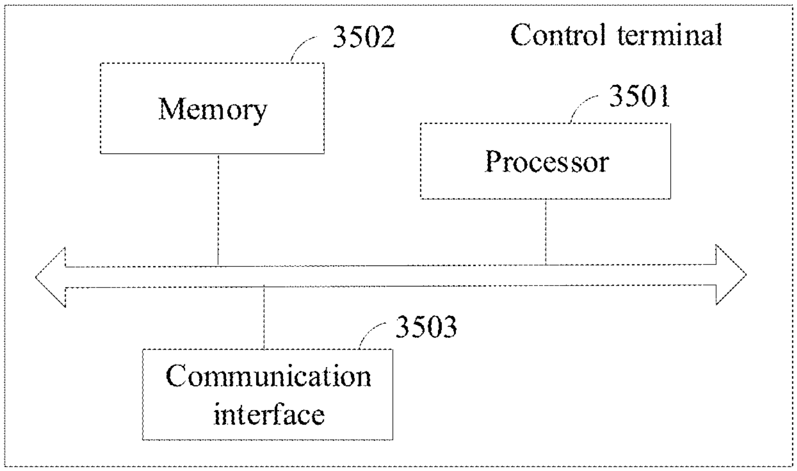
FIG. 35 is a schematic structural diagram of a control terminal consistent with the present disclosure.

The present disclosure also provides a control terminal. As shown in FIG. 35, which is a schematic structural diagram of a control terminal consistent with the present disclosure, the control terminal may be used for controlling an aerial vehicle, and the aerial vehicle may include a gimbal for carrying an image acquisition device. The control terminal may execute the control method of the aerial vehicle provided by various embodiments of the present disclosure, such as that shown in FIG. 14. The control terminal includes:

at least one memory 3502 for storing at least one computer program; and at least one processor 3501 for running the at least one computer program stored in the at least one memory 3502 to realize: displaying an aerial vehicle trajectory selection control and a gimbal control; generating a preliminary-flight trajectory of the aerial vehicle based on the user's operation on the aerial vehicle trajectory selection control, where the preliminary-flight trajectory is used to control the aerial vehicle; generating gimbal control information based on the user's operation on the gimbal control, where the gimbal control information is used to control the gimbal and image acquisition device to photograph the target object; and sending the preliminary-flight trajectory and gimbal control information to the aerial vehicle to automatically control the aerial vehicle.

In one embodiment, the control terminal also includes a communication interface 3503 for the control terminal to communicate with other devices or a communication network.

The control terminal shown in FIG. 35 may also implement the implementation methods and implementation effects of the methods of the embodiments shown in FIG. 14 to FIG. 18 and FIG. 22 to FIG. 33. For the part not described in detail in this embodiment, reference may be made to the relevant description of the embodiments shown in FIG. 14-FIG. 18 and FIG. 22-FIG. 33. The execution process and technical effects of the technical solution are described in the embodiments shown in FIG. 14-FIG. 18 and FIG. 22-FIG. 33, and will not be repeated here.

Figure 36:
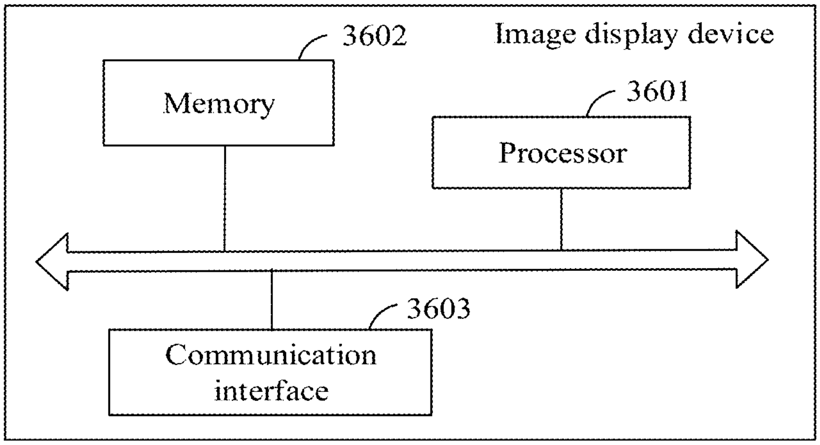
FIG. 36 is a schematic structural diagram of an image display device consistent with the present disclosure.

The present disclosure also provides an image display device. As shown in FIG. 36, which is a schematic structural diagram of an image display device consistent with the present disclosure, the image display device may be provided at a control terminal used for controlling an aerial vehicle, and the aerial vehicle may include a gimbal for carrying an image acquisition device. The image display device may execute the image display method provided by various embodiments of the present disclosure, such as that shown in FIG. 19. The image display device includes:

at least one memory 3602 for storing at least one computer program; and at least one processor 3601 for running the at least one computer program stored in the at least one memory 3602 to realize: obtaining the real-time captured image of the image acquisition device; determining the device attitude of the image acquisition device and the terminal attitude of the control terminal; and based on the device attitude and the terminal attitude, determining the image display attitude corresponding to the real-time acquisition image, to ensure that the image seen by the user is in the correct orientation.

In one embodiment, the image display device also includes a communication interface 3603 for the image display device to communicate with other devices or a communication network.

The image display device shown in FIG. 36 may also implement the implementation methods and implementation effects of the methods of the embodiments shown in FIG. 19 to FIG. 33. For the part not described in detail in this embodiment, reference may be made to the relevant description of the embodiments shown in FIG. 19-FIG. 33. The execution process and technical effects of the technical solution are described in the embodiments shown in FIG. 19-FIG. 33, and will not be repeated here.

Figure 37:
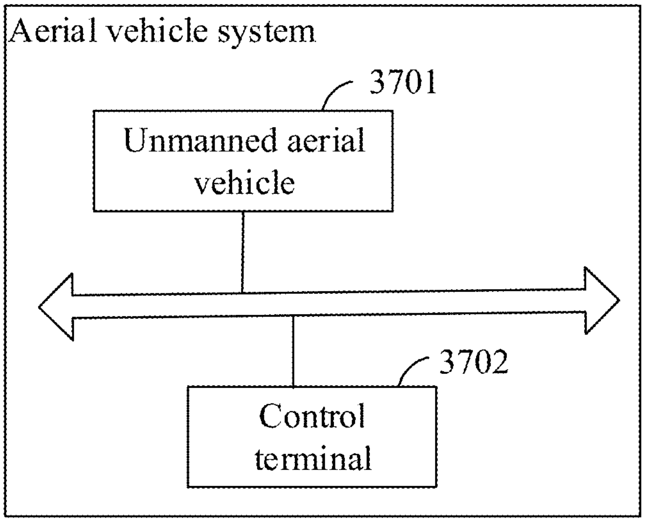
FIG. 37 is a schematic structural diagram of an aerial vehicle system consistent with the present disclosure.

The present disclosure also provides an aerial vehicle system. As shown in FIG. 37, which is a schematic structural diagram of an aerial vehicle system provided by the present disclosure, the aerial vehicle system may be able to realize the photographing operation of the target object. The aerial vehicle system includes: an aerial vehicle 3701, such as a UAV, provided by any embodiments of the present disclosure corresponding to FIG. 34 above; and a control terminal 3702, which is connected to the aerial vehicle 3701 in communication and is used to control the aerial vehicle 3701.

The implementation manners and implementation effects of the aerial vehicle system in this embodiment are similar to the implementation manners and implementation effects of the aerial vehicle 3701 in the embodiment shown in FIG. 34 above. For the part not described in detail in this embodiment, reference can be made to the relevant description of the embodiment shown in FIG. 34. The execution process and technical effect of this technical solution refer to the description in the embodiment shown in FIG. 34, which will not be repeated here.

Figure 38:
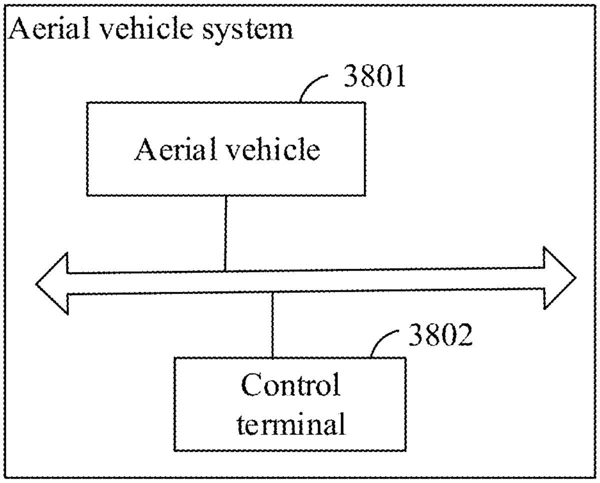
FIG. 38 is a schematic structural diagram of another aerial vehicle system consistent with the present disclosure.

In another embodiment shown in FIG. 38, which is a schematic structural diagram of another aerial vehicle system, the aerial vehicle system may realize the photographing operation of the target object; and include: an aerial vehicle 3801, such as a UAV; and a control terminal 3802 provided by various embodiments of the present disclosure shown in FIG. 35, which is connected to the aerial vehicle 3801 in communication, and is used to control the aerial vehicle 3801.

The implementation manners and implementation effects of the aerial vehicle system in this embodiment are similar to the implementation manners and implementation effects of the control terminal 3802 in the embodiment shown in FIG. 35. For the parts not described in detail in this embodiment, reference can be made to the relevant description of the embodiment shown in FIG. 35. The execution process and technical effect of this technical solution refer to the description in the embodiment shown in FIG. 35, which will not be repeated here.

Figure 39:
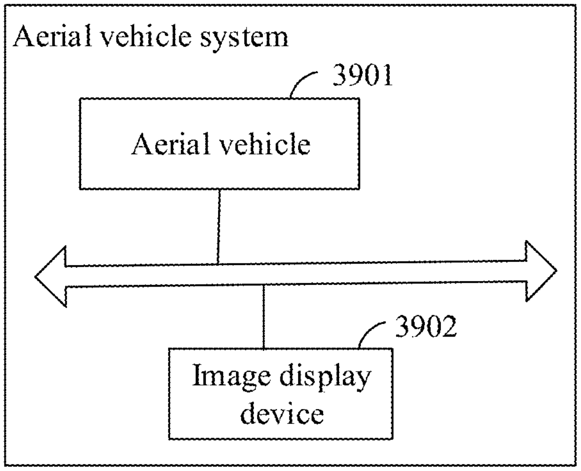
FIG. 39 is a schematic structural diagram of an aerial vehicle system consistent with the present disclosure.

In another embodiment shown in FIG. 39, which is a schematic structural diagram of another aerial vehicle system, the aerial vehicle system may realize the photographing operation of the target object; and include: an aerial vehicle 3901 such as a UAV; and an image display device 3902 provided by various embodiments of the present disclosure shown in FIG. 36, which is connected to the aerial vehicle 3901 in communication, and is used to obtain images to be displayed.

The implementation manners and implementation effects of the aerial vehicle system in this embodiment are similar to the implementation manners and implementation effects of the image display device 3902 in the embodiment shown in FIG. 36. For the parts not described in detail in this embodiment, reference can be made to the relevant description of the embodiment shown in FIG. 36. The execution process and technical effect of this technical solution refer to the description in the embodiment shown in FIG. 36, which will not be repeated here.

Another aspect of the present disclosure provides a computer-readable storage medium. The computer-readable storage medium may be configured to store program instructions. When the program instructions are executed, a device where the storage medium is located may implement any control method of an aerial vehicle provided by various embodiments of the present disclosure.

Another aspect of the present disclosure provides a computer program product. When the computer program product is executed by a processor of an electronic device, the electronic device may implement any control method of an aerial vehicle provided by various embodiments of the present disclosure.

Another aspect of the present disclosure provides a computer-readable storage medium. The computer-readable storage medium may be configured to store program instructions. When the program instructions are executed, a device where the storage medium is located may implement any image display method provided by various embodiments of the present disclosure.

Another aspect of the present disclosure provides a computer program product. When the computer program product is executed by a processor of an electronic device, the electronic device may implement any image display method provided by various embodiments of the present disclosure.

The disclosed related detection devices and methods can be implemented in other ways. For example, the detection device embodiments described above are only schematic, for example, the division of the modules or units is only a logical function division, and there may be other division methods in actual implementation, such as multiple units or components can be combined or integrated into another system, or some features can be ignored, or not executed. The mutual coupling or direct coupling or communication connection shown or discussed can be through some interfaces, the indirect coupling or communication connection of the detection device or unit, which can be electrical, mechanical or other forms. The units described as separate components may or may not be physically separated, and the components displayed as units may or may not be physical units, that is, they may be located in one place, or they may be distributed on multiple network units. Some or all of the units may be selected according to actual needs to realize the purpose of the scheme of this embodiment.

The embodiments of the present disclosure may take the form of a computer program product implemented on one or more storage media (including but not limited to disk storage, CD-ROM, optical storage, etc.) containing program code. Computer-usable storage media include permanent and non-permanent, removable and non-removable media, and information storage can be implemented by any method or technology. Information can be a computer-readable instruction, a data structure, a module of a program, or other data. Examples of computer storage media include but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only compact disk read-only memory (CD-ROM), digital versatile disk (DVD) or other optical storage, magnetic cassettes, magnetic tape magnetic disk storage or other magnetic storage devices or any other non-transmission media that can be used to store information that can be accessed by a computing device.

The units described as separate components may or may not be physically separated, and the components shown as units may or may not be physical units, that is, they may be located in one place, or they may be distributed on multiple network units. Some or all of the units may be selected according to actual needs to realize the purpose of the present disclosure. In addition, the functional units in the various embodiments of the present disclosure may be integrated in a processing unit, or each unit may exist physically separately, or two or more units may be integrated in one unit. The above-mentioned integrated units may be implemented in the form of hardware or in the form of software functional units.

When the integrated unit is implemented in the form of a software functional unit and sold or used as an independent product, it may be stored in a computer-readable storage medium. Based on this understanding, the technical solution of the present disclosure, in essence, or all or part of the technical solution, may be embodied in the form of a software product, and the computer software product may be stored in a storage medium, including several instructions for a computer processor to execute all or part of the steps of the method described in each embodiment of the present disclosure. The aforementioned storage medium may include: a flash disk, a mobile hard disk, a read-only memory (ROM), a random access memory (RAM), a magnetic hard disk, an optical disk, or other media that can store program code.

In the present disclosure, terms such as “certain embodiments,” “one embodiment,” “some embodiments,” “illustrative embodiments,” “examples,” “specific examples” or “some examples,” mean that a specific feature, structure, material or characteristic described in connection with the embodiments or examples is included in at least one embodiment or example of the present disclosure. In the present disclosure, schematic representations of the above terms do not necessarily refer to the same embodiment or example. Furthermore, the specific features, structures, materials or characteristics described may be combined in any suitable manner in any one or more embodiments or examples.

The functionality of the elements disclosed herein may be implemented using circuitry or processing circuitry which includes general purpose processors, special purpose processors, integrated circuits, ASICs (“Application Specific Integrated Circuits”), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Various embodiments have been described to illustrate the operation principles and exemplary implementations. Those skilled in the art would understand that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A control method of an aerial vehicle including a gimbal carrying an image acquisition device, comprising:

obtaining a preliminary-flight trajectory of the aerial vehicle and control information of the gimbal, the preliminary-flight trajectory and the control information of the gimbal being set by a user;

automatically controlling the aerial vehicle to move according to the preliminary-flight trajectory; and automatically controlling the gimbal and the image acquisition device to photograph a target object according to the control information of the gimbal;

wherein the preliminary-flight trajectory and the control information of the gimbal are separately configured, the control information of the gimbal is determined based on a target photographing mode of the gimbal selected by the user from a plurality of preset photographing modes, each of the plurality of preset photographing modes includes an attitude and an attitude change of the gimbal during photographing by the image acquisition device, the target photographing mode of the gimbal selected by the user is determined based on a user operation on a screen, the screen is configured to display the plurality of preset photographing modes of the gimbal, and the plurality of preset photographing modes include a matching photographing mode of the gimbal that matches the preliminary-flight trajectory.

2. The method according to claim 1, wherein obtaining the control information of the gimbal includes:

obtaining the target photographing mode of the gimbal; and determining the control information of the gimbal according to the target photographing mode of the gimbal.

3. The method according to claim 1, wherein:

distances between adjacent track points in the preliminary-flight trajectory and the target object are different; and the matching photographing mode of the gimbal includes horizontal-vertical switching photographing.

4. The method according to claim 3, wherein:

the distances between adjacent track points in the preliminary-flight trajectory and the target object gradually increase, and the matching photographing mode of the gimbal includes vertical-to-horizontal switching photographing; or the distances between adjacent track points in the preliminary-flight trajectory and the target object gradually decrease, and the matching photographing mode of the gimbal includes horizontal-to-vertical switching photographing.

5. The method according to claim 1, further comprising at least one of:

determining the matching photographing mode of the gimbal based on an aspect ratio of the target object; or determining the matching photographing mode of the gimbal based on a relative proportion between a length and a width of the target object on the screen;

wherein determining the matching photographing mode of the gimbal based on the aspect ratio of the target object includes:

in response to the aspect ratio being greater than a first threshold, determining that the matching photographing mode of the gimbal includes horizontal photographing;

in response to the aspect ratio being less than a second threshold, determining that the matching photographing mode of the gimbal includes vertical photographing; or in response to the aspect ratio being greater than or equal to the second threshold and less than or equal to the first threshold, determining that the matching photographing mode of the gimbal includes horizontal-vertical switching photographing; and determining the matching photographing mode of the gimbal based on the relative proportion between the length and the width includes:

in response to the length of the target object being greater than the width, determining that the matching photographing mode of the gimbal includes horizontal photographing, vertical photographing, or horizontal-vertical switching photographing; or in response to the length of the target object being less than or equal to the width, determining that the matching photographing mode of the gimbal includes vertical photographing.

6. The method according to claim 2, wherein determining the control information of the gimbal according to the target photographing mode of the gimbal includes:

obtaining a preliminary-photographing duration; and determining the control information of the gimbal according to the preliminary-photographing duration and the target photographing mode of the gimbal.

7. The method according to claim 6, wherein determining the control information of the gimbal according to the preliminary-photographing duration and the target photographing mode of the gimbal includes:

in response to the target photographing mode being horizontal-vertical switching photographing, determining durations respectively corresponding to vertical photographing, horizontal-vertical switching photographing, and horizontal photographing, of the gimbal, according to the preliminary-photographing duration; and based on the durations respectively corresponding to vertical photographing, horizontal-vertical switching photographing, and horizontal photographing, of the gimbal, determining the control information of the gimbal.

8. The method according to claim 2, wherein determining the control information of the gimbal according to the target photographing mode of the gimbal includes:

obtaining preliminary-flight distance information of the aerial vehicle; and determining the control information of the gimbal based on the preliminary-flight distance information of the aerial vehicle and the target photographing mode of the gimbal.

9. The method according to claim 2, wherein determining the control information of the gimbal according to the target photographing mode of the gimbal includes:

obtaining proportion information of the target object in an image containing the target object; and determining the control information of the gimbal based on the proportion information and the target photographing mode of the gimbal.

10. The method according to claim 2, wherein the target photographing mode includes at least one of horizontal photographing, vertical photographing, horizontal-vertical switching photographing, or preset angle photographing.

11. The method according to claim 1, further comprising:

generating a video based on content captured by the image acquisition device;

obtaining an image type of a video frame in the video; and determining display information of the video frame according to the image type of the video frame.

12. The method according to claim 11, wherein:

the image type includes any one of a vertical image, a horizontal-vertical switching image, a horizontal image, or an inclined image; and determining the display information of the video frame includes:

in response to the image type of the video frame being one of the vertical image, the horizontal-vertical switching image, or the inclined image, determining that a playback speed for displaying the video frame is a first speed; and in response to the image type of the video frame is the horizontal image:

determining whether the horizontal image belongs to a first image set or a second image set;

determining that the playback speed for displaying the video frame is a second speed greater than the first speed in response to the video frame belonging to the first image set; and determining that the playback speed for displaying the video frame is the first speed in response to the video frame belonging to the second image set.

13. The method according to claim 11, wherein generating the video includes:

obtaining an original video that is captured by the image acquisition device based on horizontal photographing, vertical photographing, or horizontal-vertical switching photographing; and during rough horizontal-vertical switching of the original video, adding a rotation prompt icon to generate a target video to prompt the user to rotate a display device while watching the target video.

14. The method according to claim 1, further comprising:

obtaining a real-time position of the aerial vehicle; and displaying the real-time position of the aerial vehicle and the preliminary-flight trajectory on a map.

15. The method according to claim 1, wherein automatically controlling the gimbal and the image acquisition device to photograph the target object according to the control information of the gimbal includes:

controlling a roll axis of the gimbal according to the control information of the gimbal such that the image acquisition device reaches a corresponding photographing mode of the plurality of preset photographing modes; and controlling the image acquisition device to perform a photographing operation based on the corresponding photographing mode.

16. An aerial vehicle comprising:

a gimbal carrying an image acquisition device;

at least one processor; and at least one memory including computer program code, where the at least one memory and the at least one processor are individually or collectively configured, with the computer program code, to cause the apparatus to at least perform the method according to claim 1.

17. An aerial vehicle system comprising:

the aerial vehicle according to claim 16; and a control terminal including the screen configured to display a trajectory selection control and a gimbal control.

18. A control method of an aerial vehicle including a gimbal carrying an image acquisition device, comprising:

obtaining a preliminary-flight trajectory of the aerial vehicle and control information of the gimbal, the preliminary-flight trajectory and the control information of the gimbal being set by a user, and obtaining the control information of the gimbal including:

obtaining a photographing mode of the gimbal, the photographing mode of the gimbal being determined according to a user selection and including an attitude of the gimbal when the image acquisition device is photographing, and the photographing mode including horizontal-vertical switching photographing; and determining the control information of the gimbal according to the photographing mode of the gimbal;

automatically controlling the aerial vehicle to move according to the preliminary-flight trajectory; and automatically controlling the gimbal and the image acquisition device to photograph a target object according to the control information of the gimbal;

wherein the target photographing mode of the gimbal selected by the user is determined based on a user operation on a screen, the screen is configured to display the plurality of preset photographing modes of the gimbal, and the plurality of preset photographing modes include a matching photographing mode of the gimbal that matches the preliminary-flight trajectory.

19. A control method of an aerial vehicle including a gimbal carrying an image acquisition device, comprising:

obtaining a preliminary-flight trajectory of the aerial vehicle and control information of the gimbal, the preliminary-flight trajectory and the control information of the gimbal being set by a user, and obtaining the control information of the gimbal including:

obtaining a photographing mode of the gimbal, the photographing mode of the gimbal being determined according to a user selection and including an attitude of the gimbal when the image acquisition device is photographing, wherein the user selection is determined based on a user operation on a screen, the screen is configured to display a matching photographing mode of the gimbal that match the target object, and the matching photographing mode of the gimbal is related to a length and a width of the target object on the screen; and determining the control information of the gimbal according to the photographing mode of the gimbal;

automatically controlling the aerial vehicle to move according to the preliminary-flight trajectory;

automatically controlling the gimbal and the image acquisition device to photograph a target object according to the control information of the gimbal; and at least one of:

determining the matching photographing mode of the gimbal based on an aspect ratio of the target object; or determining the matching photographing mode of the gimbal based on a relative proportion between the length and the width;

wherein:

determining the matching photographing mode of the gimbal based on the aspect ratio of the target object includes:

in response to the aspect ratio being greater than a first threshold, determining that the matching photographing mode of the gimbal includes horizontal photographing;

in response to the aspect ratio being less than a second threshold, determining that the matching photographing mode of the gimbal includes vertical photographing; or in response to the aspect ratio being greater than or equal to the second threshold and less than or equal to the first threshold, determining that the matching photographing mode of the gimbal includes horizontal-vertical switching photographing; and determining the matching photographing mode of the gimbal based on the relative proportion between the length and the width includes:

in response to the length of the target object being greater than the width, determining that the matching photographing mode of the gimbal includes horizontal photographing, vertical photographing, or horizontal-vertical switching photographing; or in response to the length of the target object being less than or equal to the width, determining that the matching photographing mode of the gimbal includes vertical photographing.

* * * * *